United States Patent
Teyeb et al.

(10) Patent No.: US 11,523,448 B2
(45) Date of Patent: Dec. 6, 2022

(54) TUNNEL SETUP FOR SPLIT BEARERS IN MULTI-RAT DUAL CONNECTIVITY (MR-DC) AND NR-NR DUAL CONNECTIVITY (NR-DC)

(71) Applicant: Telefonaktiebolaget LM Ericsson (publ), Stockholm (SE)

(72) Inventors: Oumer Teyeb, Solna (SE); Matteo Fiorani, Solna (SE); Lian Araujo, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/253,702

(22) PCT Filed: Jul. 9, 2019

(86) PCT No.: PCT/SE2019/050680
§ 371 (c)(1),
(2) Date: Dec. 18, 2020

(87) PCT Pub. No.: WO2020/032854
PCT Pub. Date: Feb. 13, 2020

(65) Prior Publication Data
US 2021/0266991 A1      Aug. 26, 2021

Related U.S. Application Data

(60) Provisional application No. 62/714,820, filed on Aug. 6, 2018.

(51) Int. Cl.
*H04W 76/15*      (2018.01)
*H04W 76/12*      (2018.01)
(Continued)

(52) U.S. Cl.
CPC ....... *H04W 76/12* (2018.02); *H04W 28/0268* (2013.01); *H04W 76/11* (2018.02); *H04W 76/15* (2018.02)

(58) Field of Classification Search
CPC . H04W 76/12; H04W 28/0268; H04W 76/11; H04W 76/15
See application file for complete search history.

(56) References Cited

U.S. PATENT DOCUMENTS

2019/0246310 A1* 8/2019 Han ................... H04W 28/04
2019/0342932 A1 11/2019 Futaki et al.
(Continued)

FOREIGN PATENT DOCUMENTS

WO    2018128017 A1    7/2018
WO    2018130968 A1    7/2018

OTHER PUBLICATIONS

"Collected corrections for XnAP version 15.0.0", 3GPP TSG-RAN WG3 NR AH 1807 Meeting; R3-18xxxx; Montreal, Canada, Jul. 2-6, 2018, pp. 1-202.
(Continued)

*Primary Examiner* — Lakeram Jangbahadur
(74) *Attorney, Agent, or Firm* — Murphy, Bilak & Homiller, PLLC

(57) ABSTRACT

Embodiments include methods, performed by a master node (MN) in a radio access network, for establishing radio resources between a secondary node (SN) and a user equipment (UE). Such embodiments include sending, to the SN, a request identifying one or more QoS flows to be setup between the SN and the UE; and receiving, from the SN, a response including identification of one or more radio bearers that were admitted by the SN in association with the requested QoS flows. Such embodiments also include sending, to the SN, identifiers of one or more tunnels for forwarding downlink user-plane (DL UP) data over an
(Continued)

interface between the SN and the MN. Each tunnel identifier is associated with a respective admitted radio bearer. Embodiments also include complementary methods performed by a SN, as well as network nodes configured to perform the various methods.

12 Claims, 21 Drawing Sheets

(51) Int. Cl.
*H04W 76/11* (2018.01)
*H04W 28/02* (2009.01)

(56) References Cited

U.S. PATENT DOCUMENTS

| | | | | |
|---|---|---|---|---|
| 2020/0084815 | A1* | 3/2020 | Rinne | H04W 76/11 |
| 2020/0295902 | A1* | 9/2020 | You | H04L 47/624 |
| 2020/0322831 | A1* | 10/2020 | Xu | H04W 72/04 |
| 2020/0374689 | A1* | 11/2020 | Shi | H04W 8/26 |
| 2021/0092656 | A1* | 3/2021 | Yang | H04W 36/0011 |
| 2021/0274486 | A1* | 9/2021 | Yang | H04W 76/15 |

OTHER PUBLICATIONS

"3GPP TS 36.300 V15.2.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Jun. 2018, pp. 1-357.
"3GPP TS 37.340 V15.2.0", 3rd Generation Partnership Project; Technical Specification Group Radio Access Network; Evolved Universal Terrestrial Radio Access (E-UTRA) and NR; Multi-connectivity; Stage 2 (Release 15), Jun. 2018, pp. 1-55.
"3GPP TS 38.401 V15.2.0", 3rd Generation Partnership Project; Technical Specification Group Radio Access Network; NG-RAN; Architecture description (Release 15), Jun. 2018, pp. 1-39.
"3GPP TS 38.473 V15.2.1", 3rd Generation Partnership Project; Technical Specification Group Radio Access Network; NG-RAN; F1 application protocol (F1AP) (Release 15), Jul. 2018, pp. 1-161.
"3GPP TS 38.331 V15.2.1", 3rd Generation Partnership Project; Technical Specification Group Radio Access Network; NR; Radio Resource Control (RRC) protocol specification (Release 15), Jun. 2018, pp. 1-303.
"3GPP TS 38.304 V15.0.0", 3rd Generation Partnership Project; Technical Specification Group Radio Access Network; NR; User Equipment (UE) procedures in Idle mode and RRC Inactive state (Release 15), Jun. 2018, pp. 1-25.
"3GPP TR 38.806 V15.0.0", 3rd Generation Partnership Project; Technical Specification Group Radio Access Network; Study of separation of NR Control Plane (CP) and User Plane (UP) for split option 2; (Release 15), Dec. 2017, pp. 1-22.
"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.
"3GPP TS 33.401 V15.8.0", 3rd Generation Partnership Project; Technical Specification Group Services and System Aspects; 3GPP System Architecture Evolution (SAE); Security architecture (Release 15), Jun. 2019, pp. 1-163.
"TS 23.501 V15.2.0", 3rd Generation Partnership Project; Technical Specification Group Services and System Aspects; System Architecture for the 5G System; Stage 2 (Release 15), Jun. 2018, pp. 1-217.
"3GPP TS 38.423 V15.0.0", 3rd Generation Partnership Project; Technical Specification Group Radio Access Network; NG-RAN; Xn application protocol (XnAP) (Release 15), Jun. 2018, pp. 1-195.
"3GPP TR38.804 V14.0.0", 3rd Generation Partnership Project; Technical Specification Group Radio Access Network; Study on New Radio Access Technology; Radio Interface Protocol Aspects (Release 14), Mar. 2017, pp. 1-57.
"(TP for NR BL CR for TS 37.340): DC establishment for PDCP Termination at SN", 3GPP TSG-RAN WG3 NR AdHoc 1807, R3-183701, Montreal, Canada, Jul. 2-6, 2018, pp. 1-3.
"(TP for NR BL CR for TS 38.423): DC establishment for PDCP Termination at SN", 3GPP TSG-RAN WG3 NR AdHoc 1807, R3-183698, Montreal, Canada, Jul. 2-6, 2018, pp. 1-12.
"XnU bearer establishment at setup of SN-terminated bearers", 3GPP TSG-RAN WG3 Meeting #101bis, R3-185867, Chengdu, P.R. China, Oct. 8-12, 2018, pp. 1-3.

* cited by examiner

| PDU Session Resources To Be Added List | | 1 |
|---|---|---|
| >PDU Session Resources To Be Added Item | | 1 .. <maxnoofPDUSessions> |
| >>PDU Session ID | M | |
| >>S-NSSAI | M | |
| >>Bearer Configurations To Be Added | | 1 .. <maxnoofBearerConfigs> |
| >>>CHOICE Bearer Configuration | M | |
| >>>>SN terminated Bearer | | |
| >>>>>PDU Session Resource Setup Info – SN-terminated | M | |
| >>>>MN terminated Bearer | | |
| >>>>>PDU Session Resource Setup Info – MN terminated | M | |

FIG. 8A

| IE/Group Name | Presence | Range |
|---|---|---|
| UL NG-U UP TNL Information at UPF | M | |
| PDU Session Type | M | |
| QoS Flows To Be Setup List | | 1 |
| >QoS Flows To Be Setup Item IEs | | 1 .. <maxnoofQoSFlows> |
| >>QoS Flow Indicator | M | |
| >>QoS Flow Level QoS Parameters | M | |
| >>Offered GBR QoS Flow Information | O | |
| DL Forwarding | O | |
| Security Indication | O | |

FIG. 8B

| IE/Group Name | Presence | Range |
|---|---|---|
| UL NG-U UP TNL Information at UPF | M | |
| PDU Session Type | M | |
| QoS Flows To Be Setup List | | 1 |
| >QoS Flows To Be Setup Item IEs | | 1 .. <maxnoofQoSFlows> |
| >>QoS Flow Indicator | M | |
| >>QoS Flow Level QoS Parameters | M | |
| >>Offered GBR QoS Flow Information | O | |
| DL Forwarding | O | |
| Security Indication | O | |

FIG. 8C

| | | |
|---|---|---|
| PDU Session Resources Admitted To Be Added List | | 1 |
| >PDU Session Resources Admitted To Be Added Item | | 1 .. <maxnoofPDUSessions> |
| >>PDU Session ID | M | |
| >>Bearer Configurations Admitted To Be Added | | 1 .. <maxnoofBearerConfigs> |
| >>>CHOICE Bearer Configuration | M | |
| >>>>SN terminated Bearer | | |
| >>>>>PDU Session Resource Setup Response Info – SN-terminated | M | |
| >>>>MN terminated Bearer | | |
| >>>>>PDU Session Resource Setup Response Info – MN terminated | M | |
| >>>>>PDU Session Resource Setup Info – MN terminated | M | |

FIG. 8D

| IE/Group Name | Presence | Range |
|---|---|---|
| NG-U DL UP TNL Information at NG-RAN | M | |
| DRBs To Be Setup List | | 1 |
| >DRBS to Be Setup Item IEs | | 1 .. <maxnoof DRBs> |
| >>DRB ID | M | |
| >>SN UL PDCP UP TNL Information | O | |
| >>QoS Flows To Be Setup List | | 1 |
| >>>QoS Flows To Be Setup Item IEs | | 1 .. <maxnoof QoS Flows> |
| >>>>QoS Flow Indicator | M | |
| >>>>MCG requested GBR QoS Flow Info. | O | |
| QoS Flows Not Admitted List | O | |
| DL Forwarding UP TNL Information | O | |
| UL Forwarding UP TNL Information | O | |

FIG. 8E

| IE/Group Name | Presence | Range |
|---|---|---|
| DRBs Admitted List | | 1 |
| >DRBS Admitted Item IEs | | 1 .. <maxnoof DRBs> |
| >>DRB ID | M | |
| >>S-Node DL SCG UP TNL Information | M | |

FIG. 8F

| IE/Group Name | Presence | Range | Semantics description |
|---|---|---|---|
| Message Type | M | | |
| M-NG-RAN node UE XnAP ID | M | | Allocated at M-NG-RAN node |
| S-NG-RAN node UE XnAP ID | M | | Allocated at S-NG-RAN node |
| Response Information | M | | |
| >CHOICE Response Type | M | | |
| >>Configuration successfully applied | | | |
| >>>M-NG-RAN node to S-NG-RAN node Container | O | | Includes RRCReconfigurationComplete message as defined in subclause 6.2.2 of TS 38.331 [10]. |
| >>Configuration rejected by the M-NG-RAN node | | | |
| >>>Cause | M | | |
| >>>M-NG-RAN node to S-NG-RAN node Container | O | | Includes the CG-ConfigInfo message as defined in as defined in subclause 11.2.2 of TS 38.331. |
| SN-Terminated DRBs To Configure List | | 0..1 | Included when tunnel information needs to be provided to SN for SN-terminated split bearer or SN-terminated MCG bearers. |
| >SN Terminated DRBs To Configure Item IEs | | 1 .. <maxnoof DRBs> | |
| >>DRB ID | M | | |
| >>MN DL PDCP UP TNL Information | M | | |

FIG. 8G

| IE/Group Name | Presence | Range | Semantics description |
|---|---|---|---|
| Message Type | M | | |
| M-NG-RAN node UE XnAP ID | M | | Allocated at M-NG-RAN node |
| S-NG-RAN node UE XnAP ID | M | | Allocated at S-NG-RAN node |
| Response Information | M | | |
| >CHOICE Response Type | M | | |
| >>Configuration successfully applied | | | |
| >>>M-NG-RAN node to S-NG-RAN node Container | O | | Includes RRCReconfigurationComplete message as defined in subclause 6.2.2 of TS 38.331 [10]. |
| >>Configuration rejected by the M-NG-RAN node | | | |
| >>>Cause | M | | |
| >>>M-NG-RAN node to S-NG-RAN node Container | O | | Includes the CG-ConfigInfo message as defined in as defined in subclause 11.2.2 of TS 38.331. |
| CHOICE Bearer Configuration | M | | |
| > SN terminated Bearer | | | |
| >>DRBs To Configure List | | 0..1 | Included when tunnel information needs to be provided to SN for SN-terminated split bearer or SN-terminated MCG bearers. |
| >>>DRBs To Configure Item IEs | | 1.. <maxnoof DRBs> | |
| >>>>DRB ID | M | | |
| >>>>MN DL PDCP UP TNL Information | M | | |

FIG. 8H

| IE/Group Name | Presence | Range |
|---|---|---|
| UL NG-U UP TNL Information at UPF | M | |
| PDU Session Type | M | |
| QoS Flows To Be Setup List | | 1 |
| >QoS Flows To Be Setup Item IEs | | 1 .. <maxnoofQoSFlows> |
| >>QoS Flow Indicator | M | |
| >>QoS Flow Level QoS Parameters | M | |
| >>Offered GBR QoS Flow Information | O | |
| >>Offered MN DL PDCP UP TNL Information | O | *The MN can decide to offer for each QoS Flow and DL PDCP UP TNL that the SN can use for establishing SN-terminated split bearers or SN-terminated MCG bearers.* |
| Security Indication | O | |

FIG. 8I

| IE/Group Name | Presence | Range |
|---|---|---|
| UL NG-U UP TNL Information at UPF | M | |
| PDU Session Type | M | |
| QoS Flows To Be Setup List | | 1 |
| >QoS Flows To Be Setup Item IEs | | 1 .. <maxnoofQoSFlows> |
| >>QoS Flow Indicator | M | |
| >>QoS Flow Level QoS Parameters | M | |
| >>Offered GBR QoS Flow Information | O | |
| DL UP TNL Info List | | 0 .. 1 |
| >DL UP TNL Info Item IEs | | 1 .. <maxnoofDRBs> |
| >>MN DL UP PDCP TNL Information | M | |
| Security Indication | O | |

FIG. 8J

| IE/Group Name | Presence | Range |
|---|---|---|
| UL NG-U UP TNL Information at UPF | M | |
| PDU Session Type | M | |
| QoS Flows To Be Setup List | | 1 |
| >QoS Flows To Be Setup Item IEs | | 1 .. <maxnoofQoSFlows> |
| >>QoS Flow Indicator | M | |
| >>QoS Flow Level QoS Parameters | M | |
| >>Offered GBR QoS Flow Information | O | |
| MN DL UP TNL Root Info | | O |
| Security Indication | | O |

FIG. 8K

| IE/Group Name | Presence | Range |
|---|---|---|
| NG-U DL UP TNL Information at NG-RAN | M | |
| DRBs To Be Setup List | | 1 |
| >DRBS to Be Setup Item IEs | | 1 .. <maxnoof DRBs> |
| >>DRB ID | M | |
| >>SN UL PDCP UP TNL Information | M | |
| >>MN UL PDCP UP TNL Information | M | |
| >>QoS Flows To Be Setup List | | 1 |
| >>>QoS Flows To Be Setup Item IEs | | 1 .. <maxnoof QoS Flows> |
| >>>>QoS Flow Indicator | M | |
| >>>>MCG requested GBR QoS Flow Information | O | |
| QoS Flows Not Admitted List | O | |
| DL Forwarding UP TNL Information | O | |
| UL Forwarding UP TNL Information | O | |

FIG. 8L

| IE/Group Name | Presence | Range |
|---|---|---|
| NG-U DL UP TNL Information at NG-RAN | M | |
| DRBs To Be Setup List | | 1 |
| >DRBs to Be Setup Item IEs | | 1 .. <maxnoof DRBs> |
| >>DRB ID | M | |
| >>SN UL PDCP UP TNL Information | M | |
| >>MN UL PDCP UP TNL Information ID | M | |
| >>QoS Flows To Be Setup List | | 1 |
| >>>QoS Flows To Be Setup Item IEs | | 1 .. <maxnoof QoS Flows> |
| >>>>QoS Flow Indicator | M | |
| >>>>MCG requested GBR QoS Flow Information | O | |
| QoS Flows Not Admitted List | O | |
| DL Forwarding UP TNL Information | O | |
| UL Forwarding UP TNL Information | O | |

FIG. 8M

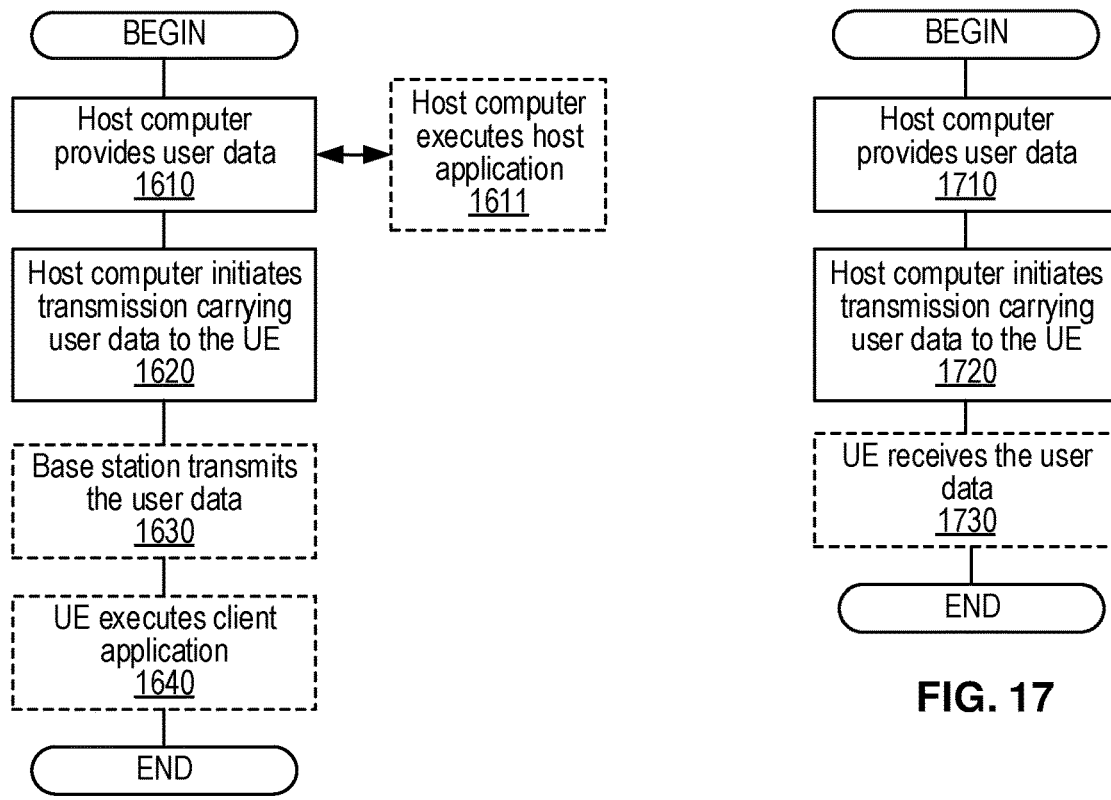
FIG. 16
FIG. 17
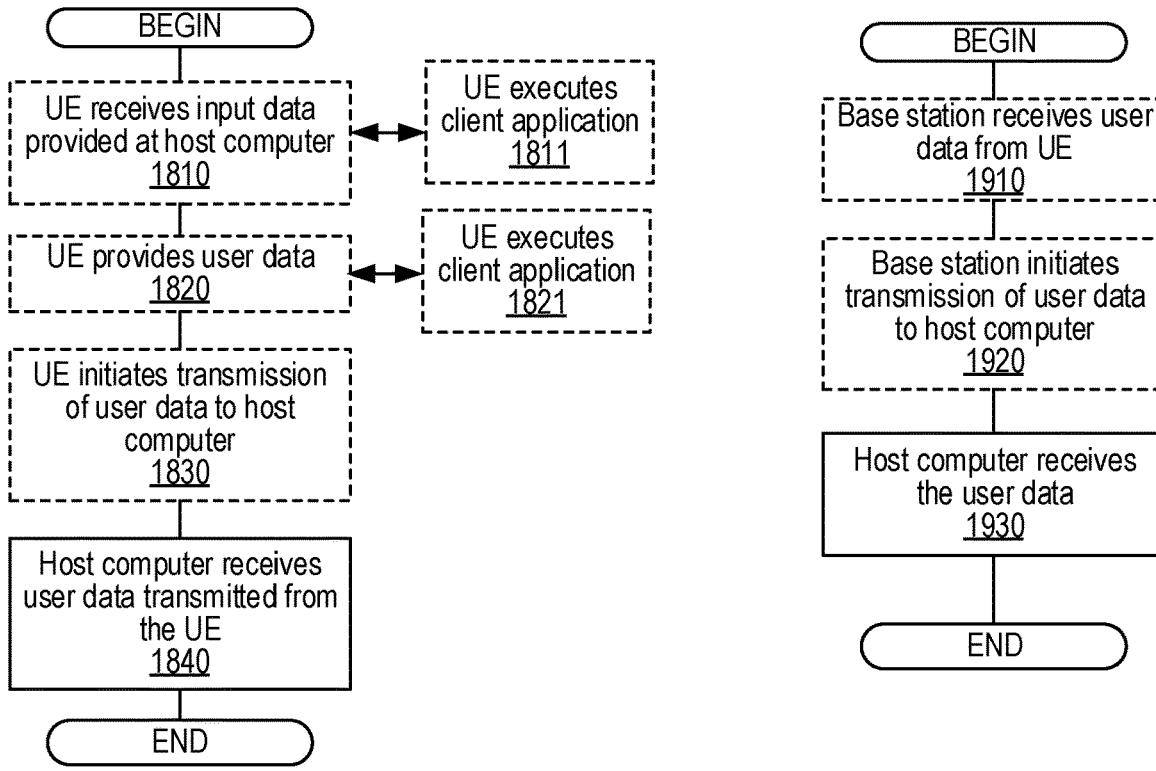
FIG. 18
FIG. 19

TUNNEL SETUP FOR SPLIT BEARERS IN MULTI-RAT DUAL CONNECTIVITY (MR-DC) AND NR-NR DUAL CONNECTIVITY (NR-DC)

TECHNICAL FIELD

The present application relates generally to the field of wireless communication networks, and more specifically to devices, methods, and computer-readable media that facilitate simultaneous connectivity of a device or user equipment (UE) to multiple nodes in a radio access network (RAN).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

In LTE, the Radio Resource Control (RRC) protocol is used to configure, setup, and maintain the radio connection between the user equipment (UE) and the base station, known as the evolved Node B (eNB). When the UE receives an RRC message from the eNB, it will apply the configuration (also referred to herein as "compile the configuration"), and if this succeeds the UE generates an RRC complete message that indicates the transaction ID of the message that triggered this response.

Since LTE Release 8, three Signaling Radio Bearers (SRBs), namely SRB0, SRB1 and SRB2 have been available for the transport of RRC and Non-Access Stratum (NAS) messages between the UE and eNB. A new SRB, known as SRB1bis, was also introduced in rel-13 for supporting DoNAS (Data Over NAS) in NB-IoT.

SRB0 carries RRC messages using the CCCH logical channel, and it is used for handling RRC connection setup, resume, and re-establishment. Once the UE is connected to the eNB (i.e., RRC connection setup or RRC connection reestablishment/resume has succeeded), SRB1 is used for handling further RRC messages (which may include a piggybacked NAS message) and NAS messages, prior to the establishment of SRB2, all using DCCH logical channel. SRB2 is used for RRC messages such as logged measurement information, as well as for NAS messages, all using DCCH. SRB2 has a lower priority than SRB1, because logged measurement information and NAS messages can be lengthy and could cause the blocking of more urgent and smaller SRB1 messages. SRB2 is always configured by E-UTRAN after security activation.

A dual connectivity framework has been defined in LTE Release 12. Dual connectivity (or DC) refers to a mode of operation in which a UE, in RRC_CONNECTED state, consumes radio resources provided by at least two different network points connected to one another with a non-ideal backhaul. In the LTE standards, these two network points may be referred to as a "Master eNB" (MeNB) and a "Secondary eNB" (SeNB). More generally, they can be referred to as a master node (MN) and a secondary node (SN). DC can be viewed as a special case of carrier aggregation (CA), where the aggregated carriers, or cells, are provided by network nodes that are physically separated from one another and that are not connected to one another through a fast, quality, connection.

More specifically, in DC, the UE is configured with a Master Cell Group (MCG) and a Secondary Cell Group (SCG). A Cell Group (CG) is a group of serving cells associated with either the MeNB or the SeNB(s). MCG and SCG are defined as follows:

The Master Cell Group (MCG) is a group of serving cells associated with the MeNB, including a primary cell (PCell) and optionally one or more secondary cells (SCells).

A Secondary Cell Group (SCG) is a group of serving cells associated with the SeNB, including a Primary SCell (pSCell) and optionally one or more SCells.

Put another way, a UE in DC maintains simultaneous connections to anchor and booster nodes, where the anchor node is also referred to as the MeNB and the booster nodes are also referred to as SeNBs. As its name implies, the MeNB terminates the control plane connection towards the UE and, as such, is the controlling node of the UE, including handovers to and from SeNBs. For example, the MeNB is the eNB that terminates at least the S1-MME connection, i.e., the connection between the eNB and the Mobility Management Entity (MME) for the UE. An SeNB provides additional radio resources (e.g., bearers) for the UE other than those provided by the MeNB. Types of radio resource bearers include MCG bearers, SCG bearers, and split bearers.

RRC connection with the UE is handled only by the MeNB and, accordingly, SRBs (Signaling Radio Bearers) are always configured as MCG bearer type and therefore only use the radio resources of the MN. However, the MeNB can also configure the UE based on input from the SeNB and hence the SeNB can also indirectly control the UE. In an LTE-DC configuration, the MeNB is connected to the SeNBs via the Xn interface, which is currently selected to be the same as the X2 interface between the two eNBs.

According to LTE principles, UEs provide measurement reports—whether due to event trigger or a periodic trigger—comprising measurements of serving cell(s). For UE in LTE-DC, serving cell means both cells in MCG (MN) and cell in SCG (SN). For mobility measurement, MeNB configure UE according to various criteria including, e.g., frequency to measure, how to report, etc. Correspondingly, the UE sends measurement results to MeNB once the measurement criteria are met. According to LTE principles, when the UE needs to send a measurement report, whether it is due to event triggered or due to periodic trigger, the UE should always send measurement results of serving cell to network. For UE in LTE-DC, serving cell means both cells in MCG (MN) and cell in SCG (SN).

FIG. 1A illustrates various exemplary LTE DC scenarios involving UEs 110 and base stations (eNBs) 120. As shown, only one SeNB (at most) is connected to any of the illustrated UEs. However, more than one SeNB can serve a UE in general. Moreover, only one cell each from both MeNB and SeNB are shown to be serving the UE, however more than one cells can serve the UE in practice from both MeNB and SeNB. From the figure, it should also be clear that dual connectivity is a UE-specific feature and that a given network node (or a serving cell) can support a dual-connected UE and a legacy UE at the same time. In other words, MeNB and SeNB are roles played, or functions provided, by eNBs 120 for a given situation. Thus, while the eNBs 120 in FIG. 1A are labeled "MeNB" and "SeNB," this indicates only that they are playing this role for at least one UE 110. Indeed, a given eNB 120 may be an MeNB for one UE 110 while being an SeNB for another UE.

The master/anchor and secondary/booster roles are defined from a UE's point of view, which means that a node (or cell) that acts as an anchor to one UE may act as booster to another UE. Likewise, although a given UE in a DC scenario reads system information from the anchor node (or cell), a node (or cell) acting as a booster to one UE may or may not distribute system information to another UE. Furthermore, in LTE, only inter-frequency DC is supported (i.e., the MCG and SCG must use different carrier frequencies).

In summary, DC allows an LTE-capable UE to be connected to two nodes—MeNB and SeNB—to receive data from both nodes and thereby increase its data rate. The MeNB (or MN) provides system information, terminates the control plane, and can terminate the user plane. An SeNB (or SN), on the other hand, terminates only the user plane. The aggregated user plane (UP) protocol stack for LTE DC is illustrated in FIG. 1B. This UP aggregation achieves benefits such as increasing the per user throughput for users that have good channel conditions and the capability of receiving and transmitting at higher data rates than can be supported by a single node, even without a low-latency backhaul/network connection between the MeNB and SeNB.

In 3GPP, a study item on a new radio interface for 5G has recently been completed and 3GPP has now continued with the effort to standardize this new radio interface, often abbreviated by NR (New Radio).

FIG. 2A illustrates a high-level view of an exemplary 5G network architecture, consisting of a Next Generation RAN (NG-RAN) 299 and a 5G Core (5GC) 298. NG-RAN 299 can include one or more gNodeB's (gNBs) connected to the 5GC via one or more NG interfaces, such as gNBs 200, 250 connected via interfaces 202, 252, respectively. More specifically, gNBs 200, 250 can be connected to one or more Access and Mobility Management Functions (AMF) in the 5GC 298 via respective NG-C interfaces. Similarly, gNBs 200, 250 can be connected to one or more User Plane Functions (UPFs) in 5GC 298 via respective NG-U interfaces.

Although not shown, in some deployments 5GC 298 can be replaced by an Evolved Packet Core (EPC), which conventionally has been used together with LTE E-UTRAN. In such deployments, gNBs 200, 250 can connect to one or more Mobility Management Entities (MMEs) in EPC 298 via respective S1-C interfaces. Similarly, gNBs 200, 250 can connect to one or more Serving Gateways (SGWs) in EPC via respective NG-U interfaces.

In addition, the gNBs can be connected to each other via one or more Xn interfaces, such as Xn interface 240 between gNBs 200 and 250. The radio technology for the NG-RAN is often referred to as "New Radio" (NR). With respect the NR interface to UEs, each of the gNBs can support frequency division duplexing (FDD), time division duplexing (TDD), or a combination thereof.

NG-RAN 299 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501. If security protection for CP and UP data on TNL of NG-RAN interfaces is supported, NDS/IP (3GPP TS 33.401) shall be applied.

The NG RAN logical nodes shown in FIG. 2A (and described in 3GPP TS 38.401 and 3GPP TR 38.801) include a Central Unit (CU or gNB-CU) and one or more Distributed Units (DU or gNB-DU). For example, gNB 200 includes gNB-CU 210 and gNB-DUs 220 and 230. CUs (e.g., gNB-CU 210) are logical nodes that host higher-layer protocols and perform various gNB functions such controlling the operation of DUs. A DU (e.g., gNB-DUs 220, 230) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 222 and 232 shown in FIG. 2A. However, a gNB-DU can be connected to only a single gNB-CU. The gNB-CU and connected gNB-DU(s) are only visible to other gNBs and the 5GC as a gNB. In other words, the F1 interface is not visible beyond gNB-CU. Furthermore, the F1 interface between the gNB-CU and gNB-DU is specified and/or based on the following general principles:
  F1 is an open interface;
  F1 supports the exchange of signaling information between respective endpoints, as well as data transmission to the respective endpoints;
  from a logical standpoint, F1 is a point-to-point interface between the endpoints (even in the absence of a physical direct connection between the endpoints);
  F1 supports control plane (CP) and user plane (UP) separation, such that a gNB-CU may be separated in CP and UP;
  F1 separates Radio Network Layer (RNL) and Transport Network Layer (TNL);
  F1 enables exchange of user equipment (UE) associated information and non-UE associated information;
  F1 is defined to be future proof with respect to new requirements, services, and functions;
  A gNB terminates X2, Xn, NG and S1-U interfaces and, for the F1 interface between DU and CU, utilizes the F1 application part protocol (F1-AP) which is defined in 3GPP TS 38.473.

Furthermore, a CU can host protocols such as RRC and PDCP, while a DU can host protocols such as RLC, MAC and PHY. Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

It has also been agreed in 3GPP RAN3 Working Group (WG) to support a separation of gNB-CU into a CU-CP function (including RRC and PDCP for signaling radio bearers) and CU-UP function (including PDCP for user plane). The CU-CP and CU-UP functions can communicate with each other using the E1-AP protocol over the E1 interface. In addition to the new E1 interface, the F1 interface can be logically separated into CP (F1-C) and UP (F1-U) functionalities. FIG. 2B illustrates an exemplary split CU-UP/CP architecture. The following scenarios for the split CU-UP/CP architecture are defined in 3GPP TR 38.806:

CU-CP and CU-UP centralized;
CU-CP distributed and CU-UP centralized; and
CU-CP centralized and CU-UP distributed.

Returning to the above discussion about dual connectivity (DC), 3GPP TR 38.804 describes various exemplary DC scenarios or configurations where the MN and SN can apply either NR, LTE or both. The following terminology is used to describe these exemplary DC scenarios or configurations:

DC: LTE DC (i.e., both MN and SN employ LTE, as discussed above);
EN-DC: LTE-NR dual connectivity where the MN (eNB) employs LTE and the SN (gNB) employs NR;
NGEN-DC: LTE-NR dual connectivity where a UE is connected to one ng-eNB that acts as a MN and one gNB that acts as a SN. The ng-eNB is connected to the 5GC and the gNB is connected to the ng-eNB via the Xn interface.
NE-DC: LTE-NR dual connectivity where a UE is connected to one gNB that acts as a MN and one ng-eNB that acts as a SN. The gNB is connected to 5GC and the ng-eNB is connected to the gNB via the Xn interface.
NR-DC (or NR-NR DC): both MN and SN employ NR.
MR-DC (multi-RAT DC): a generalization of the Intra-E-UTRA Dual Connectivity (DC) described in TS 36.300, where a multiple Rx/Tx UE may be configured to utilize resources provided by two different nodes connected via non-ideal backhaul, one providing E-UTRA access and the other one providing NR access. One node acts as the MN and the other as the SN. The MN and SN are connected via a network interface and at least the MN is connected to the core network. EN-DC, NE-DC, and NGEN-DC are different example cases of MR-DC.

Although the DC variants that utilize the 5GC (e.g., NE-DC, NGEN-DC or NR-DC) provide various advantages, they also introduce various problems that do not exist in LTE-DC and EN-DC, primarily due to the differences in the QoS frameworks of 5GC and EPC.

SUMMARY

Exemplary embodiments disclosed herein address these problems, issues, and/or drawbacks of existing solutions by providing a flexible and efficient approach for facilitating bi-directional tunnel setup for radio resources (e.g., split bearers) in MR-DC and NR-NR DC that utilize a 5GC network. For example, this specific improvement facilitates setup of bi-directional SN-terminated bearers or SN-terminated MCG bearers associated with QoS flows. Furthermore, this specific improvement reduces implementation and testing effort required for network elements and UEs, which facilitates earlier market introduction of such features.

Exemplary embodiments include various methods and/or procedures for establishing radio resources between a secondary node (SN) and a user equipment (UE). The exemplary methods and/or procedures can be implemented, for example, by a master node (MN) (e.g., base station) in a radio access network (RAN). The exemplary methods and/or procedures can include sending, to the SN, a request identifying one of more quality-of-service (QoS) flows to be setup between the SN and the UE. The exemplary methods and/or procedures can include receiving, from the SN, an identification of one or more radio bearers that were admitted by the SN in association with the requested QoS flows. The exemplary methods and/or procedures can also include sending, to the SN, identifiers of one or more tunnels for forwarding user-plane (UP) data to a core network, each tunnel identifier associated with a respective admitted radio bearer.

Other exemplary embodiments of methods and/or procedures for establishing radio resources between a secondary node (SN) and a user equipment (UE) can include the MN sending, to the SN, a request identifying: one or more quality-of-service (QoS) flows to be setup between the SN and the UE; and one or more tunnels for forwarding user-plane (UP) data to a core network. The exemplary methods and/or procedures can also include receiving, from the SN, a response identifying: one or more radio bearers that were admitted by the SN in association with the requested QoS flows; and for each of the admitted radio bearers, a tunnel selected by the SN, from among the one or more tunnels provided in the request, for forwarding UP data associated with the particular admitted radio bearer to the core network.

Other exemplary embodiments of methods and/or procedures for establishing radio resources between a secondary node (SN) and a user equipment (UE) can be implemented by a secondary node (SN) (e.g., base station) in a radio access network (RAN). Such exemplary embodiments can include receiving, from the SN, a request identifying one of more quality-of-service (QoS) flows to be setup between the SN and the UE. The exemplary methods and/or procedures can also include admitting one or more radio bearers in association with the requested QoS flows. The exemplary methods and/or procedures can also include sending, to the MN, an identification of the admitted radio bearers in association with the requested QoS flows. The exemplary methods and/or procedures can also include receiving, from the MN, identifiers of one or more tunnels for forwarding user-plane (UP) data to a core network, each tunnel identifier associated with a respective admitted radio bearer.

Other exemplary embodiments of methods and/or procedures for establishing radio resources between a secondary node (SN) and a user equipment (UE) can include the SN receiving, from the MN, a request identifying: one or more quality-of-service (QoS) flows to be setup between the SN and the UE; and one or more tunnels for forwarding userplane (UP) data to a core network. The exemplary methods and/or procedures can also include admitting one or more radio bearers in association with the requested QoS flows. The exemplary methods and/or procedures can also include sending, to the MN, a response identifying: the admitted radio bearers in association with the requested QoS flows; and for each of the admitted radio bearers, a tunnel selected by the SN, from among the one or more tunnels provided in the request, for forwarding UP data associated with the particular admitted radio bearer to the core network.

Other exemplary embodiments include network devices (e.g., base stations, eNBs, gNBs, CUs, DUs, MNs, SNs, etc. or components thereof) configured to perform operations corresponding to any of the exemplary methods and/or procedures described herein. Other exemplary embodiments include non-transitory, computer-readable media storing program instructions that, when executed by at least one processor, configure such network devices to perform operations corresponding any of the exemplary methods and/or procedures described herein.

These and other objects, features and advantages of the exemplary embodiments of the present disclosure will become apparent upon reading the following Detailed Description in view of the Drawings briefly described below.

BRIEF DESCRIPTION OF THE DRAWINGS

FIG. 8, which includes FIGS. 8A through 8M, shows various exemplary information elements (IEs) that can be sent from a MN to an SN, according to various exemplary embodiments of the present disclosure.

FIGS. 16-19 are flow diagrams illustrating various exemplary methods and/or procedures implemented in a communication system, according to various exemplary embodiments of the present disclosure.

DETAILED DESCRIPTION

Figure 1A:
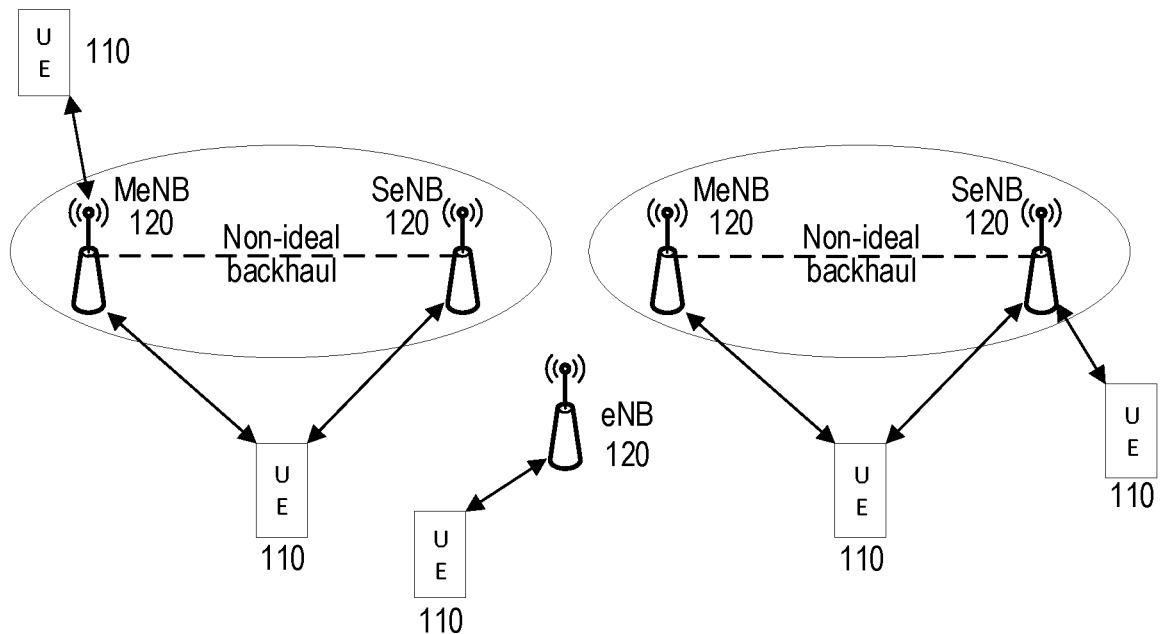
FIG. 1A is a high-level network diagram illustrating various exemplary Long-Term Evolution (LTE) dual connectivity (DC) scenarios involving user equipment (UEs) and evolved NodeBs (eNBs).
Figure 1B:
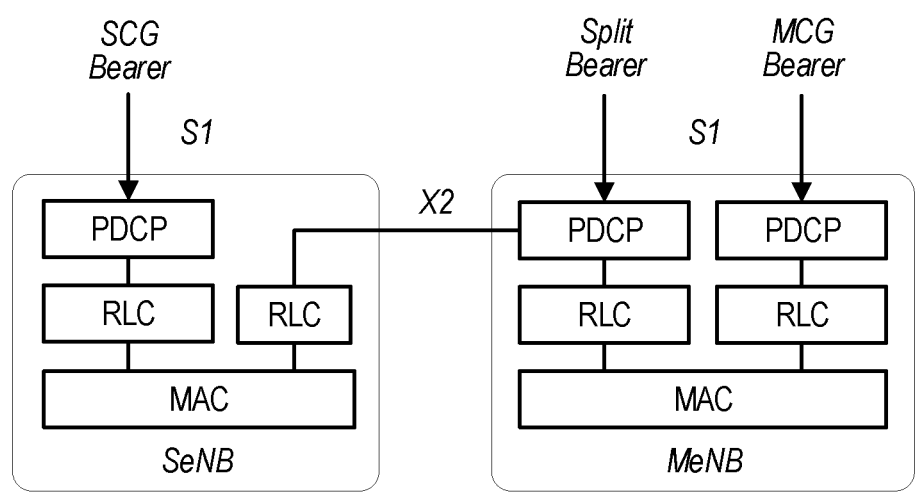
FIG. 1B illustrates an exemplary user plane (UP) protocol stack for LTE DC.
Figure 2A:
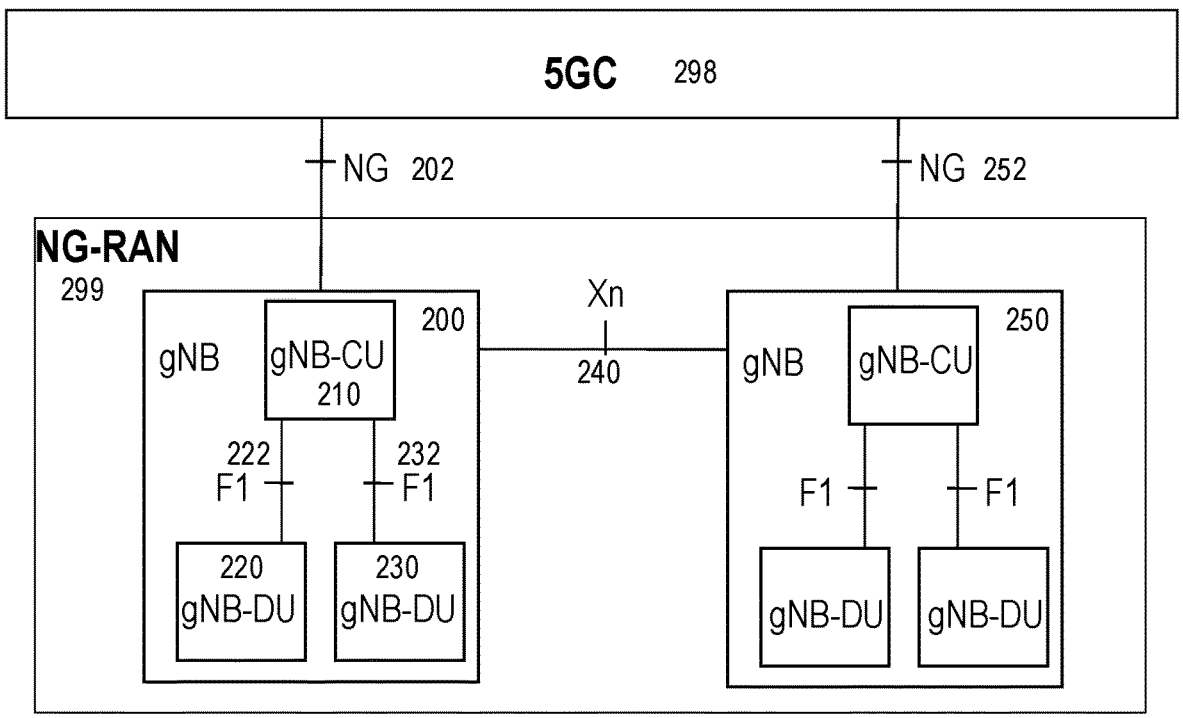
FIGS. 2A-B are block diagrams illustrating an exemplary 5G logical network architecture that is split and/or partitioned in various ways, according to exemplary embodiments of the present disclosure.
Figure 2B:
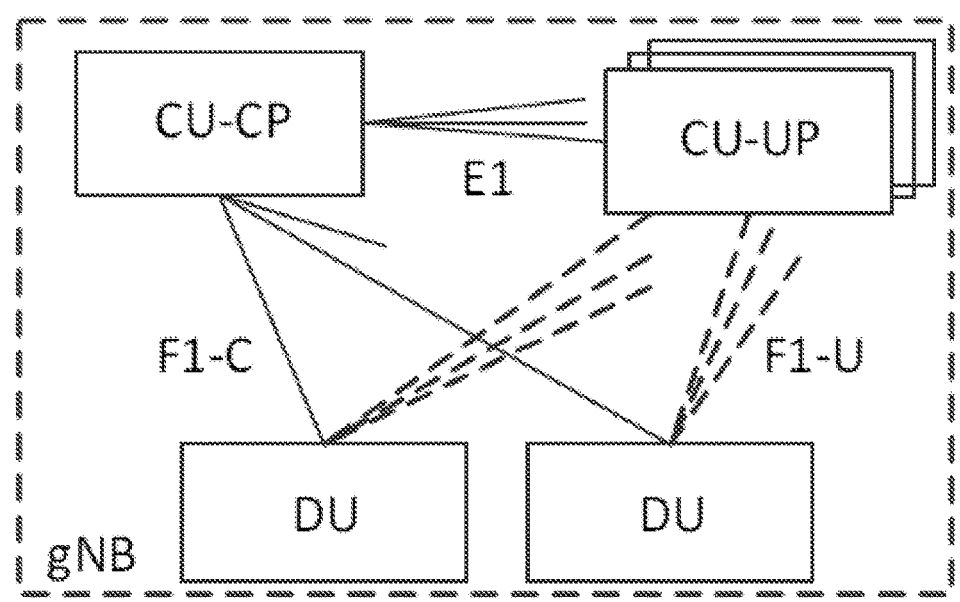

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, although the DC variants that utilize the 5GC (e.g., NE-DC, NGEN-DC, or NR-DC) provide various advantages, they also introduce various problems that do not exist in LTE-DC and EN-DC, primarily due to the differences in the QoS frameworks of 5GC and EPC. These issues are discussed in more detail below. Various DC procedures are specified in 3GPP TS 37.340, both for the variants utilizing the 5GC (i.e., NE-DC, NGEN-DC or NR-NR DC), as well as for variants utilizing the EPC (i.e., EN-DC) cases. Furthermore, detailed descriptions of messages exchanged over Xn interface between the MN and SN are provided in 3GPP TS 38.423. Nevertheless, certain aspects of these technical specifications (TS) relevant to embodiments of the present disclosure are presented below.

LTE-NR tight interworking (a form of EN-DC, with the terms being used interchangeably herein) is currently being discussed for Release 15. In this context, the major changes from LTE DC are the introduction of:

Split UP bearer from the SN, also referred to as SCG split bearer. In this case, the SN is also referred to as a SgNB (secondary gNB), where gNB is an acronym for NR base station.

Split RRC bearer (i.e., one RRC connection via MN and SN lower layers), also referred to as split SRB; and Direct RRC connection between SN and UE, also referred to as SCG SRB, direct SRB, or SRB3.

Figure 3A:
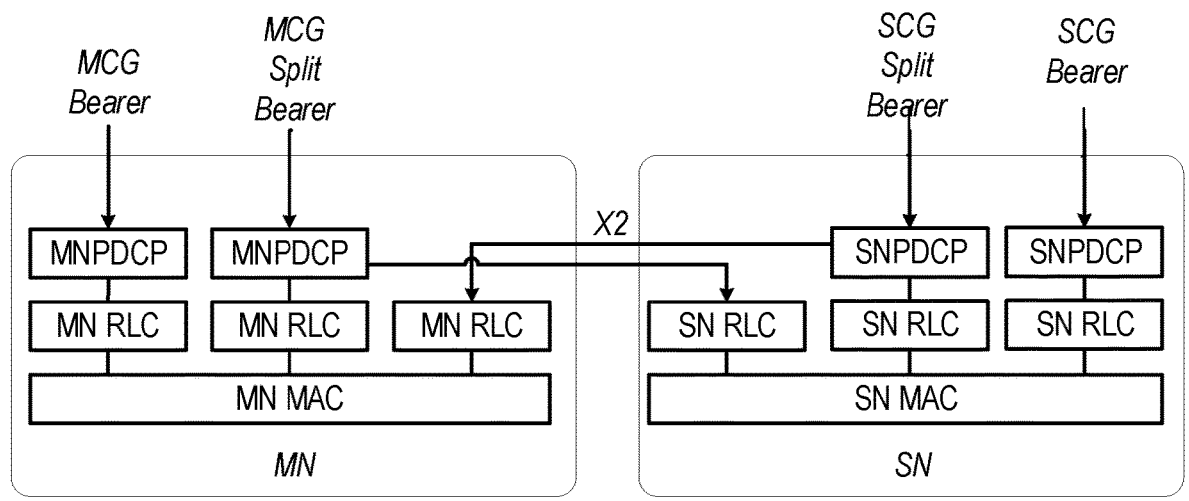
FIGS. 3A and 3B show exemplary User Plane (UP) and Control Plane (CP) architectures, respectively, for LTE-NR tight interworking, both from a network perspective.
Figure 3B:
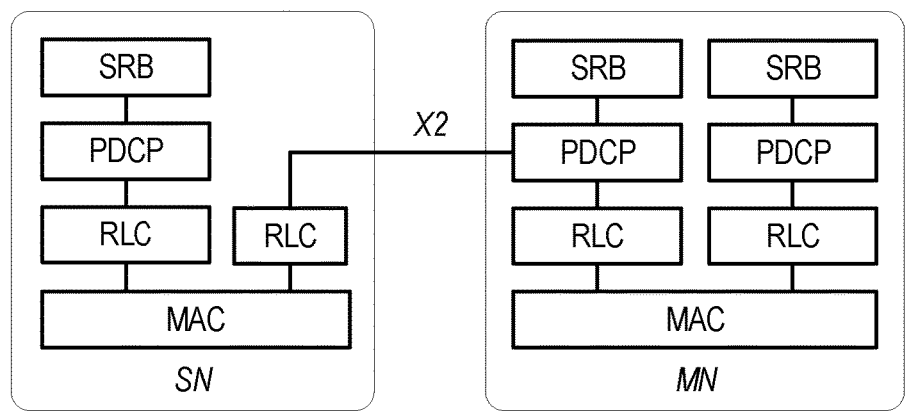
Figure 4:
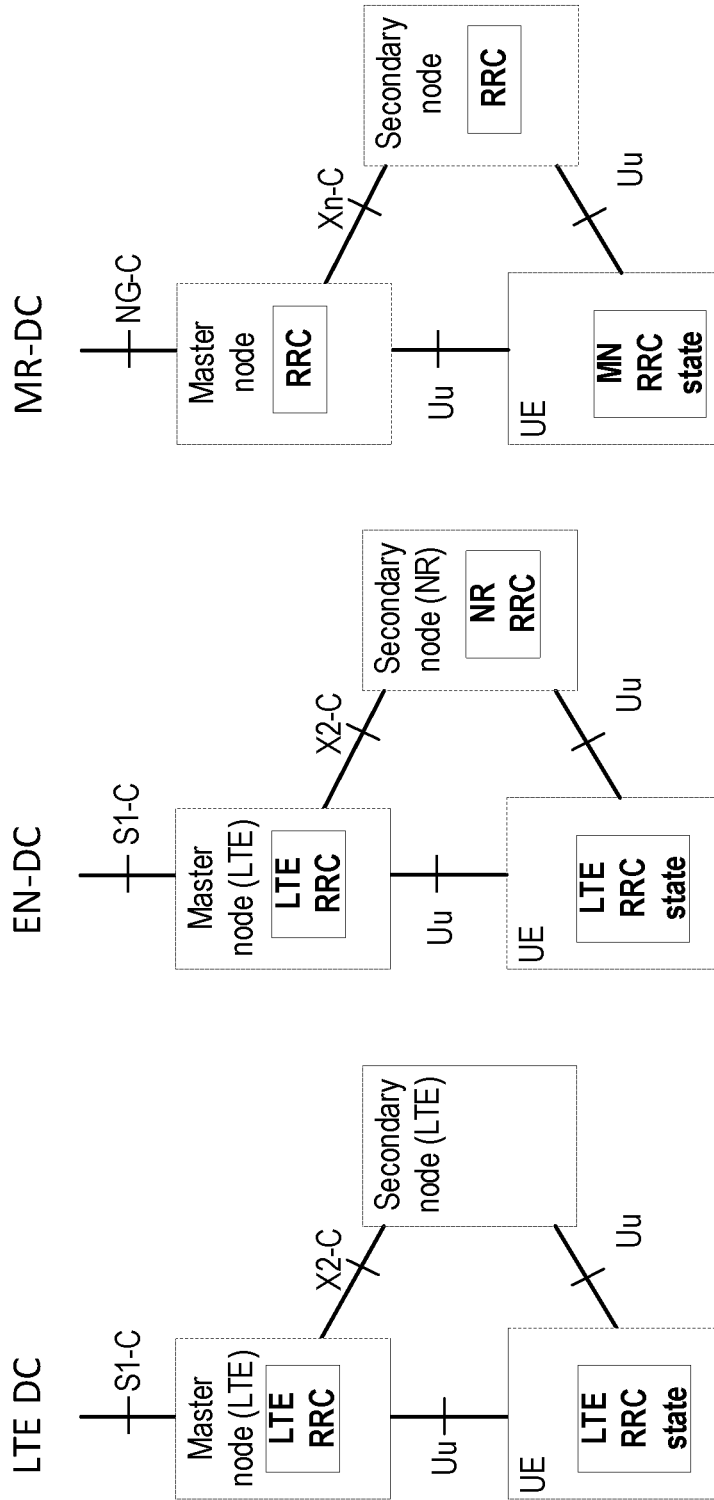
FIG. 4 is a block diagram showing exemplary CP architectures in LTE DC, EN-DC, and MR-DC using a 5G core network (5GC).
Figure 5A:
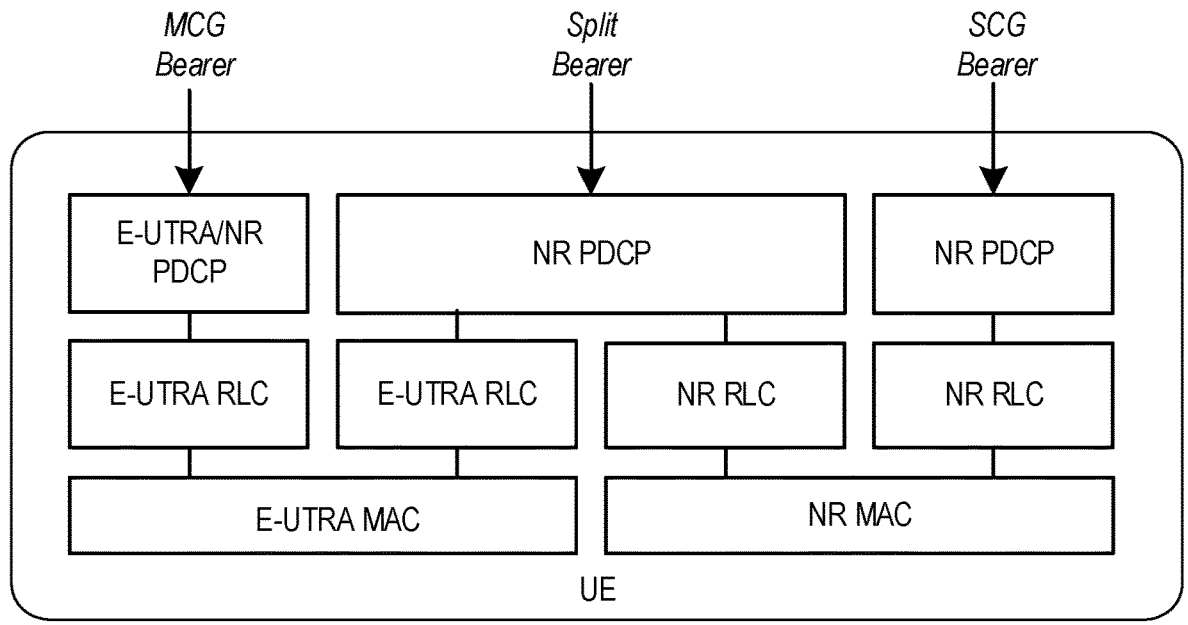
FIG. 5A shows an exemplary radio protocol architecture for MCG, SCG, and split bearers from a UE perspective in LTE-NR tight interworking.
Figure 5B:
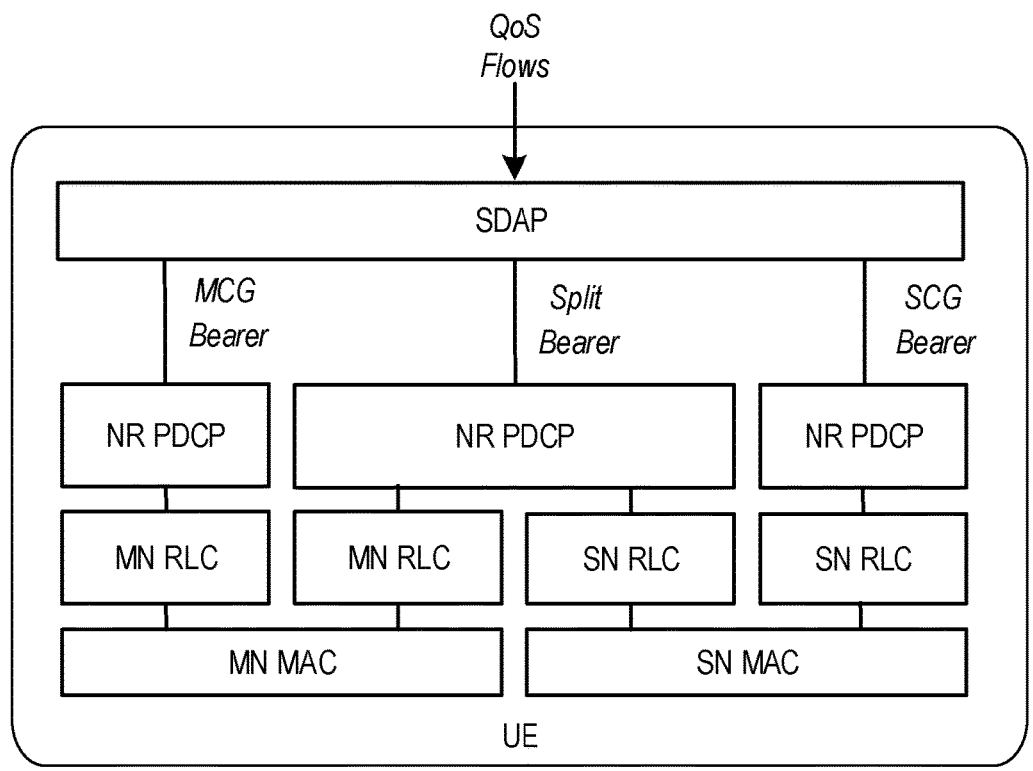
FIG. 5B shows an exemplary Radio Protocol Architecture for MCG, SCG, and split bearers from a UE perspective in MR-DC with 5GC (NGEN-DC, NE-DC).
Figure 6A:
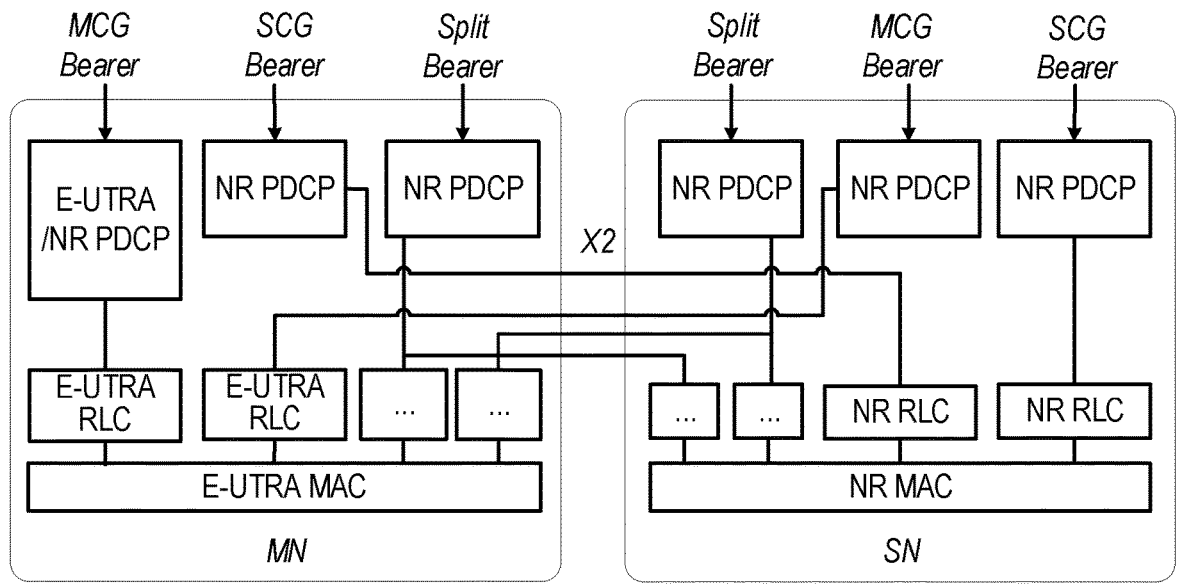
FIGS. 6A and 6B illustrate network-side protocol termination options for MCG, SCG, and split bearers in MR-DC with EPC (e.g., EN-DC) and 5GC (e.g., NGEN-DC, NE-DC), respectively.
Figure 6B:
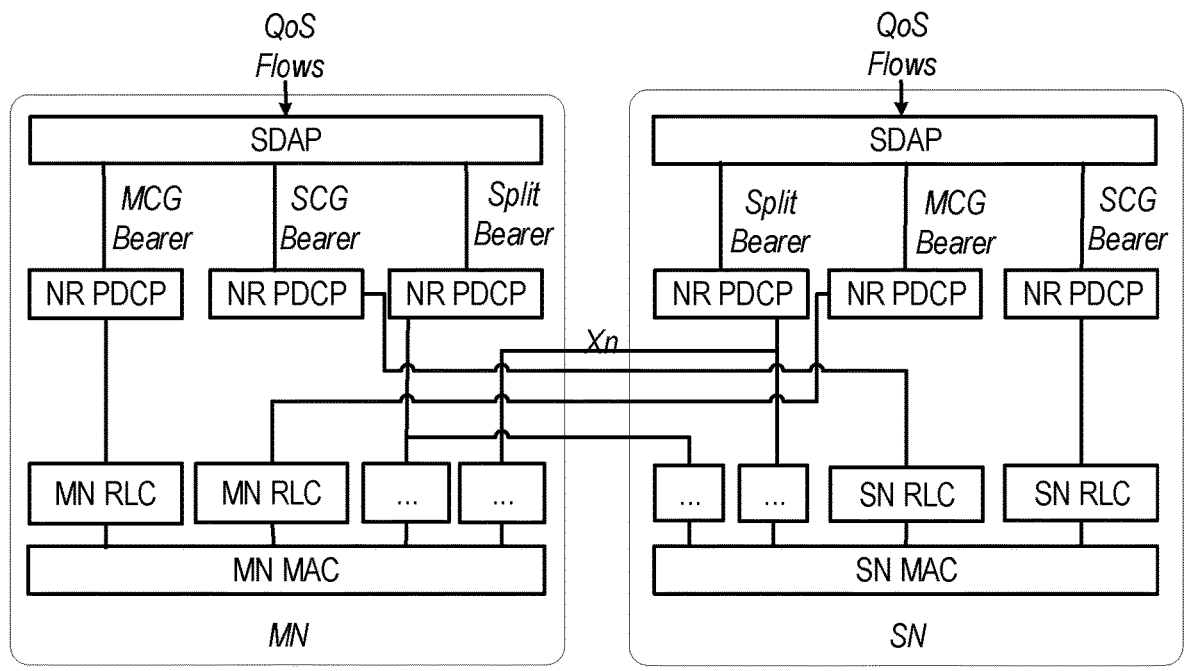

FIG. 3, which includes FIGS. 3A and 3B, shows exemplary User Plane (UP) and Control Plane (CP) architectures for LTE-NR tight interworking, both from a network perspective. FIG. 4 is a block diagram showing a high-level comparison of CP architectures in LTE DC, EN-DC, and MR-DC using a 5G core network (5GC). FIG. 5A shows an exemplary radio protocol architecture for MCG, SCG, and split bearers from a UE perspective in LTE-NR tight interworking, while FIG. 5B shows an exemplary Radio Protocol Architecture for MCG, SCG, and split bearers from a UE perspective in MR-DC with 5GC (NGEN-DC, NE-DC). Similarly, FIG. 6A illustrates network side protocol termination options for MCG, SCG; and split bearers in MR-DC with EPC (e.g., EN-DC), while FIG. 6B illustrates network side protocol termination options for MCG, SCG, and split bearers in MR-DC with 5GC (e.g., NGEN-DC, NE-DC). The following description is made with reference FIGS. 3-6.

For the first phase of 5G standardization and 5G deployment, the most likely scenario is that MN will apply LTE, and the SN will apply the NR interface, currently under standardization. Nevertheless, it should be appreciated that the explanation can equally apply to various scenarios where the MN and SN nodes utilize various radio interface technologies, e.g., both MN and SN can utilize LTE, NR, and/or other technologies, each without restriction by the other node. In some exemplary embodiments, the MN and/or SN can be subject to the RAN split architecture (e.g., CU and DU), discussed in greater detail below.

As shown in FIG. 3A, a MN can forward UP bearer traffic (e.g., on a PDCP layer) to a SN over the X2 interface, while a SN can likewise forward PDCP traffic to a MN over the X2 interface. In the first stages of EN-DC standardization/implementation, however, a likely scenario is that the NR SN is not connected directly to the 5G core network (5GC), but all UP traffic between the UE and SN is carried via the X2 interface to/from the LTE MN and, eventually, to the LTE Evolved Packet Core (EPC) network. Subsequently, DC scenarios involving NR SNs (or NR MNs) carrying UP traffic directly to/from the 5GC may be standardized for implementation.

Similarly, FIG. 3B illustrates that a UE can receive CP traffic via separate SRBs from the MN and SN. This means that a UE can receive signaling messages, i.e., RRC messages (Radio Resource Control messages) both from the MN and the SN. Consequently, in the EN-DC CP scenario shown in FIG. 3B, there are two RRC instances responsible for controlling the UE—one directed from the MN and another from the SN. A consequence is that the UE needs to terminate RRC signaling from both from the MN and the SN.

One motivation for introducing such multiple RRC instances in NR DC, and in particular for EN-DC, is to enable the MN and SN to semi-autonomously control radio resources. For example, MN can allocate resources from some spectrum using LTE, while SN can be responsible for configuring and allocating resources from some other spectrum that uses NR. Challenges for allocating resources in LTE and NR may differ substantially. For example, NR might be allocated in a spectrum where beamforming is highly desirable, while LTE might be allocated in a spectrum with good coverage but with very congested resources. As such, it is important that the SN has some level of autonomy to configure and manage the UE on its associated resources. On the other hand, the overall responsibility for connectivity to the UE may remain with MN node, such the MN node has overall responsibility for mobility, UE state changes, meeting quality of service demands, etc.

Another motivation of introducing split RRC bearers is to provide "RRC diversity" that can enable better mobility robustness and improved signaling/control message delivery between the network and the UE. For example, an RRC message (e.g., handover message or any other reconfiguration message) can be sent over the better of the two links, MeNB-UE and SgNB-UE, even if one link has deteriorated significantly. It is also possible to send duplicate messages over both MeNB-UE and SgNB-UE to achieve a better success-rate and faster delivery if the links are error prone. Such benefits of "RRC diversity" are not available in the current LTE DC solution, and 3GPP has therefore undertaken the challenge to enable such RRC diversity. Having RRC diversity may prove particularly important for use cases requiring ultra-reliable connections with low latency, often called URLLC (Ultra Reliable Low Latency Communication).

As illustrated in FIG. 3B, in the split-RRC-bearer (e.g., split SRB) architecture, RRC messages generated and/or transmitted from the MN can be sent either via the MeNB-UE (LTE) link, or relayed over an X2 interface to be sent on the SgNB-UE (NR) link. The MN LTE PDCP layer is responsible for steering each RRC message to the appropriate link. The messages received over the different paths in the UE are then combined at the LTE PDCP layer and then forwarded to the RRC layer for further processing. A similar approach can be used in the UE uplink.

In EN-DC, at initial connection establishment SRB1 uses E-UTRA PDCP. After initial connection establishment MCG SRBs (SRB1-2) can be configured by the network to use either E-UTRA PDCP or NR PDCP. A PDCP version change (release of old PDCP and establish of new PDCP) of SRBs can be supported in either direction (i.e., from E-UTRA PDCP to NR PDCP or vice-versa) via a handover procedure (reconfiguration with mobility) or, for the initial change from E-UTRA PDCP to NR PDCP, with a reconfiguration without mobility, when the network knows there is no UL data in buffer and before the initial security activation. For EN-DC capable UEs, NR PDCP can be configured for DRBs and SRBs also before EN-DC is configured.

If the SN is a gNB (i.e., for EN-DC and NGEN-DC), the UE can be configured to establish an SRB with the SN (SRB3) to enable RRC PDUs for the SN to be sent directly between the UE and the SN. RRC PDUs for the SN can only be transported directly to the UE for SN RRC reconfiguration not requiring any coordination with the MN. Measurement reporting for mobility within the SN can be done directly from the UE to the SN if SRB3 is configured. Split SRB is supported for all MR-DC options, allowing duplication of RRC PDUs generated by the MN, via the direct path and via the SN. Split SRB uses NR PDCP. This version of the specification does not support the duplication of RRC PDUs generated by the SN via the MN and SN paths.

In EN-DC, the SCG configuration is kept in the UE during suspension. The UE releases the SCG configuration (but not the radio bearer configuration) during resumption initiation.

With reference to FIG. 4, for MR-DC, each radio node has its own RRC entity (E-UTRA version for eNBs, NR version for gNBs) that can generate RRC PDUs to be sent to the UE. RRC PDUs generated by the SN can be transported via the MN to the UE. The MN always sends the initial SN RRC configuration via MCG SRB (SRB1), but subsequent reconfigurations may be transported via MN or SN. When transporting RRC PDUs from the SN, the MN does not modify the UE configuration provided by the SN.

There are three different bearer types in MR-DC: MCG bearer, SCG bearer, and split bearer. However, the UE- and network-side protocol terminations differ for these bearer types depending on the type of MR-DC utilized. For MR-DC using the EPC (e.g., EN-DC), the UE and network protocol terminations for these three bearer types are depicted in FIGS. 5A and 6A, respectively. For EN-DC, the network can configure either E-UTRA PDCP or NR PDCP for MN terminated MCG bearers while NR PDCP is always used for all other bearers.

For MR-DC using 5GC (e.g., NGEN-DC, NE-DC), the UE- and network-side protocol terminations for these three bearer types are depicted in FIGS. 5B and 6B, respectively. In this arrangement, NR PDCP is used for all bearer types. In NGEN-DC, E-UTRA RLC/MAC is used in the MN while NR RLC/MAC is used in the SN. In NE-DC, NR RLC/MAC is used in the MN while E-UTRA RLC/MAC is used in the SN.

Figure 7:
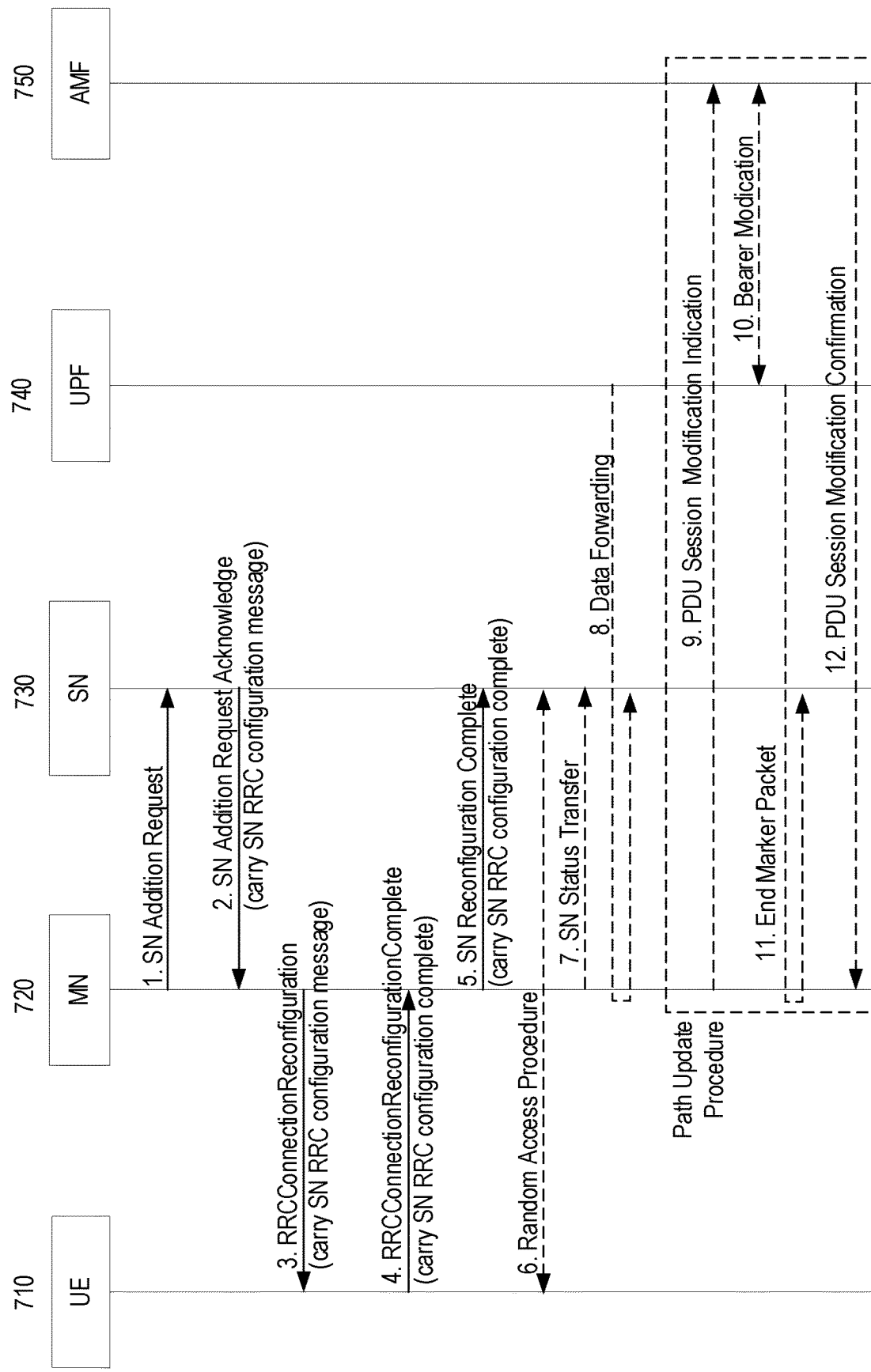
FIG. 7 illustrates an exemplary secondary node (SN) addition procedure for MR-DC cases utilizing a 5GC, according to various exemplary embodiments of the present disclosure.

FIG. 7 illustrates an exemplary secondary node (SN) addition procedure for DC cases utilizing a 5GC. The exemplary procedure is illustrated in the context of an exemplary NG-RAN/5GC arrangement that includes a UE 710, a MN 720, a SN 730, a user-plane function (UPF) 740, and an Access Management Function (AMF) 750. Moreover, MN 720 and SN 730 shown in FIG. 7 can utilize the exemplary protocol architecture illustrated in FIG. 6B.

The SN Addition procedure is initiated by the MN and is used to establish a UE context at the SN in order to provide radio resources from the SN to the UE. For bearers requiring SCG radio resources, this procedure can be used to add at least the initial serving cell of the SCG. This procedure can also be used to configure an SN-terminated MCG bearer (where no SCG configuration is needed). The operations shown in the exemplary procedure of FIG. 7 are labelled numerically, but this numbering is used only to facilitate clarity in the following description. Moreover, the numerical order is merely exemplary, and the order of the various operations can be rearranged in certain embodiments. Dashed lines indicate optional operations whose performance may depend on one or more conditions.

In operation 1, the MN decides to request the target SN to allocate radio resources for one or more specific PDU Sessions/QoS Flows, indicating QoS Flows characteristics (QoS Flow Level QoS parameters, PDU session level transport network layer (TNL) address information, and PDU session level Network Slice info). For example, the TNL address information can include a GPRS Tunneling Protocol (GTP) Tunnel Endpoint Identifier (TEID) and a TNL Internet Protocol (IP) address, such as defined in 3GPP TS 38.423. This TNL address information generally identifies a "tunnel." Accordingly, in the following description, the terms "tunnel information," "tunnel identifier(s)," and "TNL address information" are used interchangeably.

In addition, for bearers requiring SCG radio resources, MN indicates the requested SCG configuration information, including the entire UE capabilities and the UE capability coordination result. In this case, the MN also provides the latest measurement results for the SN to use when choosing and configuring the SCG cell(s). The MN can also request the SN to allocate radio resources for split SRB operation. The MN can also provide the needed security information to the SN (e.g., even if no SN-terminated bearers are setup) to enable SRB3 to be setup based on SN decision. For bearer options that require Xn-U resources between the MN and the SN, MN can also provide Xn-U TNL address information, e.g., Xn-U DL (i.e., downlink) TNL address information for SN-terminated bearers and Xn-U UL (i.e., uplink) TNL address information for MN terminated bearers. The SN may reject the request.

In operation 2, If the RRM entity in the SN is able to admit the resource request, it allocates respective radio resources and, dependent on the bearer type options, respective transport network resources. For bearers requiring SCG radio resources the SN triggers UE Random Access so that synchronisation of the SN radio resource configuration can be performed. The SN decides the PSCell and other SCG SCells and provides the new SCG radio resource configuration to the MN in a SN RRC configuration message contained in the SN Addition Request Acknowledge message. In case of bearer options that require Xn-U resources between the MN and the SN, the SN provides Xn-U TNL address information for the respective E-RAB, Xn-U UL TNL address information for SN-terminated bearers, Xn-U DL TNL address information for MN terminated bearers. For SN-terminated bearers, the SN provides the NG-U DL TNL address information for the respective PDU Session and security algorithm. If SCG radio resources have been requested, the SCG radio resource configuration is provided.

In operation 3, the MN sends the MN RRC reconfiguration message to the UE including the SN RRC configuration message, preferably without modifying it. In operation 4, the UE applies the new configuration and replies to MN with MN RRC reconfiguration complete message, including a SN RRC response message for SN, if needed. In case the UE is unable to comply with (part of) the configuration included in the MN RRC reconfiguration message, it performs the reconfiguration failure procedure. In operation 5, the MN informs the SN that the UE has completed the reconfiguration procedure successfully via SN Reconfiguration Complete message, including the encoded SN RRC response message, if received from the UE.

In operation 6, if configured with bearers requiring SCG radio resources, the UE performs synchronization towards the PSCell configured by the SN. The order in which the UE sends the MN RRC reconfiguration complete message and performs the Random-Access (RA) procedure towards the SCG is not defined. Moreover, a successful RA procedure towards the SCG is not required for a successful completion of the RRC Connection Reconfiguration procedure. In operation 7, in case of SN-terminated bearers using RLC AM, the MN sends SN Status Transfer to the SN.

In operation 8, in case of SN-terminated bearers using RLC AM, and dependent on the bearer characteristics of the respective QoS Flows, the MN may take actions to minimize service interruption due to activation of MR-DC (Data forwarding). In operations 9-12, for SN-terminated bearers, the update of the UP path towards the 5GC is performed via PDU Session Path Update procedure.

In the SN-Addition Request message (operation 1), the MN sends a list of the UE's QoS flows/bearers that it wants to be handled by the SN (e.g., either as SN-terminated flows or MN-terminated bearers). FIG. 8A shows the contents of an exemplary PDU session resources to be added List IE (Information element) including this information. FIGS. 8B and 8C, respectively, show the contents of exemplary PDU Session Resource Setup Info—SN terminated and PDU Session Resource Setup Info—MN terminated IEs shown in FIG. 8A.

In the PDU Session Resource Setup Info—SN terminated IE, the MN provides a list of the QoS flows that it wants the SN to setup (i.e., SN-terminated) and also provides an "Offered GBR QoS Flow information", which is an indication to the SN that it can add this flow as part of a split bearer and how much resource the MN is willing to provide for the sake of this flow (It is up to the SN to use this resource or not). The UL NG-U UP TNL Information at UPF IE is sent also to the SN to provide the tunnel information for sending the UL data to the core network.

Note that the information in the PDU Session Resource Setup Info—SN terminated IE (FIG. 8B) is communicated at QoS flow level. For example, the MN provides a list of QoS flows to the SN, which can decide how many radio resources (e.g., DRBs) to establish to serve these QoS flows. The MN doesn't know in advance how many bearers the SN will group the QoS flow into. For example, there can be 10 QoS flows in the list, and the SN can decide to have just two bearers, each aggregating 5 QoS flows. Consequently, the tunnel information is not provided in the PDU Session Resource Setup Info—SN terminated IE, since when sending the SN Addition Request, the MN does not know how many DRBs the SN will establish and therefore it does not know how many tunnels are required.

In the PDU Session Resource Setup Info—MN terminated IE (FIG. 8C), the MN provides a list of the bearers that it wants SN to setup, but only for MN terminated bearers (i.e., MCG split bearer). The MN can also provide the MN UL PDCP UP TNL Information for each bearer, which is the tunnel information to be used by the SN to forward UL data of MCG split bearers towards the MN. In contrast to the SN-terminated setup, the information in the PDU Session Resource Setup Info—MN terminated IE is at the bearer level. This is because, in this case, the MN decides how many DRBs to establish for serving the QoS flows. Therefore, it can directly provide the uplink tunnel information in the SN Addition Request message that can be used to establish the required tunnels.

In the SN-Addition Request Acknowledge message (operation 2), the SN can provide the list of the QoS flows/bearers that it has admitted (either as SCG bearers, SCG split bearers or MCG split bearers) in the PDU session resources admitted to be added List IE (shown in FIG. 8D), along with the PDU Session Resource Setup Response Info—SN terminated and PDU Session Resource Setup Response Info—MN terminated IES that are part of it (shown respectively in FIGS. 8E and 8F).

In the PDU Session Resource Setup Response Info—SN terminated IE (FIG. 8E), the SN provides a list of the QoS flows that has admitted (grouped in the bearers that it has associated them with). If the SN has used the resources, if any, indicated by the MN (as provided in the Offered GBR QoS Flow information as discussed above), the SN indicates the amount of resources that the MN should provide in MCG requested GBR QoS Flow Information. This amount should be less than or equal to the Offered GBR QoS Flow information). The NG-U DL UP TNL Information at NG-RAN IE provides the tunnel information for sending the DL data from the core network. This information can be further forwarded from the MN to the CN later, so that both the tunnel end points are properly set for that PDU session in both the UL and DL directions.

In the PDU Session Resource Setup Info—MN terminated IE (FIG. 8F), the SN provides a list of the bearers that it has admitted (i.e., MCG split bearers) along with the S-Node DL SCG UP TNL Information, which is the tunnel information that the MN has to use to send data of MCG split bearers in the DL.

As explained above, during an SN addition procedure, the MN provides QoS flow level—rather than bearer-level—information for the SN-terminated bearers because it doesn't know how the SN will decide to map the QoS flows into bearers. In other words, the MN does not know how many DRBs the SN will setup and for how many of these DRBs the SN will request MCG resources. This prevents the MN from providing tunnel information that is to be used for transmitting split bearer data. When the SN responds, it provides the UL tunnel information (e.g., in the SN UL PDCP UP TNL Information IE that is shown in FIG. 8E). However, the SN still is not aware of the tunnel information for transmitting DL data towards the MN for SN-terminated split bearers. This problem is unique to the 5GC QoS framework; in the EPS QoS framework there is one-to-one mapping between E-RABs and DRBs, such that the MN is always aware of how many DRBs are going to be established by the SN.

Accordingly, current solutions (e.g., as specified in 3GPP standards) neither provide nor facilitate the correct setup of SCG split bearers in MR-DC utilizing a 5GC network. Consequently, only UL data transmission is possible over the Xn interface for SN-terminated bearers (i.e., no DL data). As such, it is not possible to setup bidirectional SN-terminated bearers or SN-terminated MCG bearers.

Exemplary embodiments of the present disclosure address these and other problems and/or shortcomings of prior solutions by providing mechanisms to facilitate proper tunnel setup for radio resources (e.g., split bearers) in MR-DC and NR-NR DC. In some exemplary embodiments, the current SN reconfiguration complete message can be augmented and/or improved to provide the tunnel information from the MN to the SN during the SN addition procedure. For example, when sending the SN Reconfiguration Complete message, the MN can be aware of the of the number of DRBs that the SN has decided to setup and is aware of the DRB-flow mapping.

FIG. 8G illustrates an exemplary SN Reconfiguration Complete message that can be used for realization of these embodiments. In this realization, the MN includes in the SN Reconfiguration Complete message the list of DRBs that were actually admitted (or terminated) by the SN and, for each of these DRBs, the associated tunnel information. This is provided in the SN Terminated DRBs to Configure Item IE. For example, each tunnel can be identified by a tunnel endpoint ID (TEID) and an Internet Protocol (IP) address.

FIG. 8H illustrates another exemplary SN Reconfiguration Complete message that can be used for realization of these embodiments, but is encoded in different manner than the example illustrated by FIG. 8G. In this particular realization, a choice structure is used to indicate that the DRBs To Configure Item IE is provided only for bearers that have been SN-terminated. The actual content of the information provided can be the same as in FIG. 8G (e.g., DRB and corresponding tunnel information).

Note that although these embodiments, illustrated by exemplary FIGS. 8G and 8H, are described in the context of an SN addition procedure, they are equally applicable to when new SN-terminated bearers are added in the SN modification procedure, particularly where the same PDU Session Resource Setup Info—SN terminated IE is used in the SN Modification Request message. In such cases, the exemplary enhancements illustrated by FIGS. 8G and 8H to the SN Reconfiguration Complete message are also applicable when that message is sent in conjunction with an SN modification procedure.

In other exemplary embodiments, the SN Addition Request and/or SN Addition Request Acknowledge messages can be augmented and/or improved facilitate tunnel information exchange for SN-terminated bearers. More specifically, the MN can provide a list of tunnel identifiers to the SN in the SN addition request message, and the SN can identify which members of the list that it has chosen in the SN addition request acknowledge message. As one example, the MN can include in the SN Addition Request message one tunnel identifier (e.g., MN DL TEID and IP address) for each QoS Flow that the MN is requesting the SN to admit and/or terminate. The SN can then decide how many DRBs to establish for the requested QoS flows, and then provide in the SN Addition Request Acknowledge message the list of DRBs and, for each DRB, one SN UL tunnel identifier and one MN DL identifier (selected, e.g., from among the ones provided by the MN in the SN Addition Request message). For example, depending on how many bearers the SN sets up on behalf of these requested QoS flows, it can use some number of the indicated tunnels.

FIG. 8I illustrates an exemplary enhanced PDU Session Resource Setup Info—SN terminated IE that can be used for realization of these embodiments. In this particular realization, the MN includes the Offered MN DL PDCP TNL Information IE for each QoS flow in the QoS Flows to be Setup Item IE.

FIG. 8J illustrates another exemplary enhanced PDU Session Resource Setup Info SN terminated IE that can be used for realization of these embodiments, but is encoded in different manner than the example illustrated by FIG. 8I. In this realization, instead of including the Offered MN DL PDCP UP TNL Information IE in the QoS Flows To Be Setup List, a new optional list DLUP TNL Info List is defined to carry this information. The maximum size of the list should correspond to the maximum number of possible DRBs to be setup, as explained further in the following.

In these exemplary embodiments, since the MN provides the DRB-ID space that the SN can use, it knows the maximum number of bearers that the SN can configure. As such, in the above realizations, the maximum number of tunnels required to be included can be less than the maximum number of DRBs that the UE is capable of supporting.

FIG. 8K illustrates yet another exemplary enhanced PDU Session Resource Setup Info—SN terminated IE that can be used for realization of these embodiments. As shown in FIG. 8K, the MN can provide a single "root-level" tunnel information. For example, the "root-level" tunnel information can include a single IP address and one GTP TEID. If the provided root tunnel information is [IP address, TEIDx], this informs the SN that it can choose any of the TNL info in the set {[IP address, TEIDx], which includes [IP address, TEIDx+1], . . . , [IP address, TEIDx+n−1]}, where n is the number of bearers that the SN can admit. Since the MN doesn't know what n is going to be when it sends the SN addition request message, it can temporarily reserve tunnels TEIDx to TEIDx+maxDRB−1, where maxDRB is the number of bearers that the SN is able to configure. For example, the MN can reserve these particular tunnels until it gets a response from the SN.

In response to receiving an SN Addition Request message that contains an enhanced PDU Session Resource Setup Info—SN terminated IE (including, e.g., the realizations shown in FIGS. 8I-8K), the SN can respond with an SN Addition Acknowledgement message that includes an enhanced PDU Session Resources setup Response Info—SN terminated IE that indicating the tunnels that it has chosen. An example realization of an enhanced PDU Session Resource Setup Info—SN terminated IE is illustrated in FIG. 8L.

In some embodiments, some specific rules can be defined such that the MN can steer and/or guide the SN's choice of UP TNL information. For example, I in the PDU Session Resource Setup Info IE, the MN can provide the following flow-IP tuples: {flow1, DL-IP-address1}, {flow2, DL-IP-address1}, {flow3, DL-IP-address2}, {flow4, DL-IP-address2}. After receipt, the SN can decide to setup DRB1 for flow1-2 and DRB2 for flow3-4, based on its own requirements and/or preferences (e.g., not directed by the MN). Thus, the SN provides the following DRB-flow-IP tuples in the PDU Session Resource Setup Response Info IE: {DRB1, flow1-2, DL-IP-address1}, {DRB2, flow3-4, DL-IP-address2}.

In this manner, such embodiments facilitate the MN steering the SN's choice toward specific IP addresses. This can be useful, for example, when the MN has a split CU-DU architecture (e.g., one CU, multiple DUs) with DL-IP-address-1 is provided by DU1 and DL-IP-address-2 provided by DU2. It can also be useful in a non-split scenario in which the gNB is distributed in different logical units that may use different IP addresses.

Other realizations of an enhanced PDU Session Resource Setup Info—SN terminated IE can be employed to reduce the amount of information (e.g., signaling) conveyed in this IE. One possible realization is illustrated in FIG. 8M, in which the IE conveys an ID corresponding to the entry in the Tunnel list that was received in the PDU Session Resource Setup Info IE, rather than the entire tunnel information such as illustrated in FIG. 8L and discussed above. For example, if the MN had provided the list {tunnel1, tunnel2, tunnel3, tunnel4 . . . tunnel n} in the PDU Session Resource Setup Info IE, and the SN has decided to create just two bearers to accommodate all the QoS flows that it has admitted, it can just include IDs 1 and 2, to indicate the numerical order of the tunnels.

In other exemplary embodiments, the SN Addition Request message can be augmented and/or enhanced to include an ordered list of tunnel information. In such embodiments, the SN addition request acknowledge message can remained unchanged. The list order can indicate a selection preference or requirement. In such case, the SN and MN can select and/or utilize tunnels provided by the MN, starting from the first in the list and proceeding according to the list order.

For example, if the SN decides to admit n bearers, the SN choose the first n tunnels provided in the PDU session resource setup info IE. In other words, if the MN has provided {tunnel1, tunnel2, tunnelX}, and the SN has admitted n bearers (n≤X), then MN will assume that the SN is using tunnel1 for the first bearer in the DRBs To Be Setup List provided by the SN, tunnel2 for the second bearer, etc. without any explicit indication by the SN.

These exemplary embodiments also can be used in conjunction with the realizations illustrated by FIG. 8K. In other words, if the SN decides to setup n bearers, then it can use the tunnel information {[IP address, TEIDx], [IP address, TEIDx+1], . . . , [IP address, TEIDx+n−1]}, respectively, for then bearers being admitted, and the MN can implicitly know the bearer-tunnel association.

Various orders of the DRBs to Be Setup Item IEs in the DRBs to Be Setup List of the PDU Session Resource Setup Response Info—SN terminated IE can also be utilized. In some embodiments, the SN can order the bearers in this list according to the order of the tunnel information that was chosen for that bearer. For example, the first bearer in the list is using the first tunnel information that was made available in one of the options discussed above, the second bearer is using the second tunnel info, etc.

The various embodiments discussed above can provide different advantages and/or benefits, such that different embodiments may be desirable and/or preferable according to different situations. For example, the enhanced SN reconfiguration complete message (e.g., as illustrated by FIGS. 8G and 8H) can have an advantage that the MN is in full control of its own resources, since it knows the number of bearers setup in the response message from the SN, and has info about the QoS profile of each bearer. As such, the MN can distribute the tunnel endpoints of these bearers among its constituent logical units (using, e.g., different IP address ranges) to facilitate load balancing among the logical units. On the other hand, the enhanced SN Addition Request and/or SN Addition Request Acknowledge messages (e.g., as illustrated by FIGS. 8I-8M) can have an advantage of less signaling overhead compared to the enhanced SN reconfiguration complete message.

Note that although these embodiments, illustrated by exemplary enhancements shown in FIGS. 8I-8M, are described in the context of an SN addition procedure, they are equally applicable to when new SN-terminated bearers are added in the SN modification procedure, particularly where the same PDU Session Resource Setup Info—SN terminated IE is used in the SN Modification Request and/or SN Modification Request Acknowledge messages. In such cases, the exemplary enhancements illustrated by FIGS. 8I-8M to the SN Addition Request and/or SN Addition Request Acknowledge messages are also applicable when those messages are sent in conjunction with an SN modification procedure.

Figure 9:
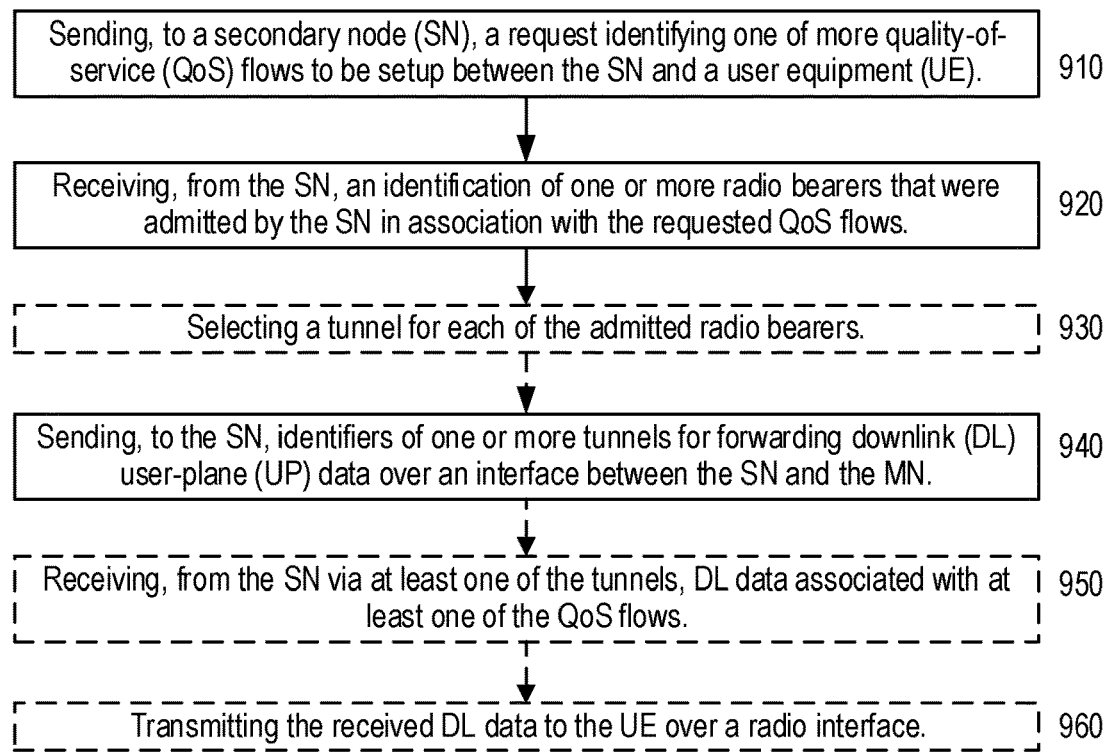
FIG. 9 is a flow diagram illustrating exemplary methods and/or procedures performed by a master node (MN, e.g., base station, eNB, gNB, etc. or component thereof) in a radio access network (RAN), according to various exemplary embodiments of the present disclosure

FIG. 9 is a flow diagram illustrating an exemplary method and/or procedure for establishing radio resources between a secondary node (SN) and a user equipment (UE)), according to various exemplary embodiments of the present disclosure. The exemplary method and/or procedure shown in FIG. 9 can be implemented, for example, by a master node (MN) (e.g., base station, eNB, gNB, etc. or component thereof) in a radio access network (RAN). Furthermore, the exemplary method and/or procedure shown in FIG. 9 can be utilized cooperatively with other exemplary method and/or procedures described herein (e.g., FIG. 10) to provide various exemplary benefits described herein. Although FIG. 9 shows blocks in a particular order, this order is merely exemplary and the operations of the exemplary method and/or procedure can be performed in a different order than shown, and can be combined and/or divided into blocks having different functionality than shown. Optional operations are indicated by dashed lines.

The exemplary method and/or procedure illustrated in FIG. 9 can include the operations of block 910, in which the MN can send, to the SN, a request identifying one or more quality-of-service (QoS) flows to be setup between the SN and the UE. In some embodiments, the one or more QoS flows identified in the request can be related to SN-terminated radio bearers that require resources provided by the MN.

The exemplary method and/or procedure can also include the operations of block 920, in which the MN can receive, from the SN, a response including identification of one or more radio bearers that were admitted by the SN in association with the requested QoS flows. For example, the admitted radio bearers can include secondary cell group (SCG) bearers, master cell group (MCG) bearers, and SCG split bearers, as illustrated in FIG. 6A.

In some embodiments, the exemplary method and/or procedure can also include the operations of block 930, where the MN can select a tunnel for one or more of the admitted radio bearers. The tunnels be selected for the SN-terminated radio bearers that require resources provided by the MN, such as SCG split bearers and MCG bearers, as illustrated in FIG. 6A. In such case, the selected tunnels can be used for forwarding downlink (DL) user-plane (UP) data over an interface between the SN and the MN (e.g., Xn interface as illustrate in FIG. 6A).

The exemplary method and/or procedure can also include the operations of block 940, where the MN can send, to the SN, identifiers of one or more tunnels (e.g., the tunnels selected in block 930) for forwarding DL UP data over an interface between the SN and the MN (e.g., an Xn interface). Each tunnel identifier is associated with a respective admitted radio bearer (e.g., an SN-terminated radio bearer that requires resources provided by the MN). In some embodiments, each tunnel identifier can include a tunnel endpoint identifier (TEID) and an Internet Protocol (IP) address.

In some embodiments, the exemplary method and/or procedure can also include the operations of block 950, where the MN can receive, from the SN via at least one of the one or more tunnels, DL UP data associated with at least one of the QoS flows. In such embodiments, the exemplary method and/or procedure can also include the operations of block 960, where the MN can transmit the received DL UP data to the UE over a radio interface.

Figure 10:
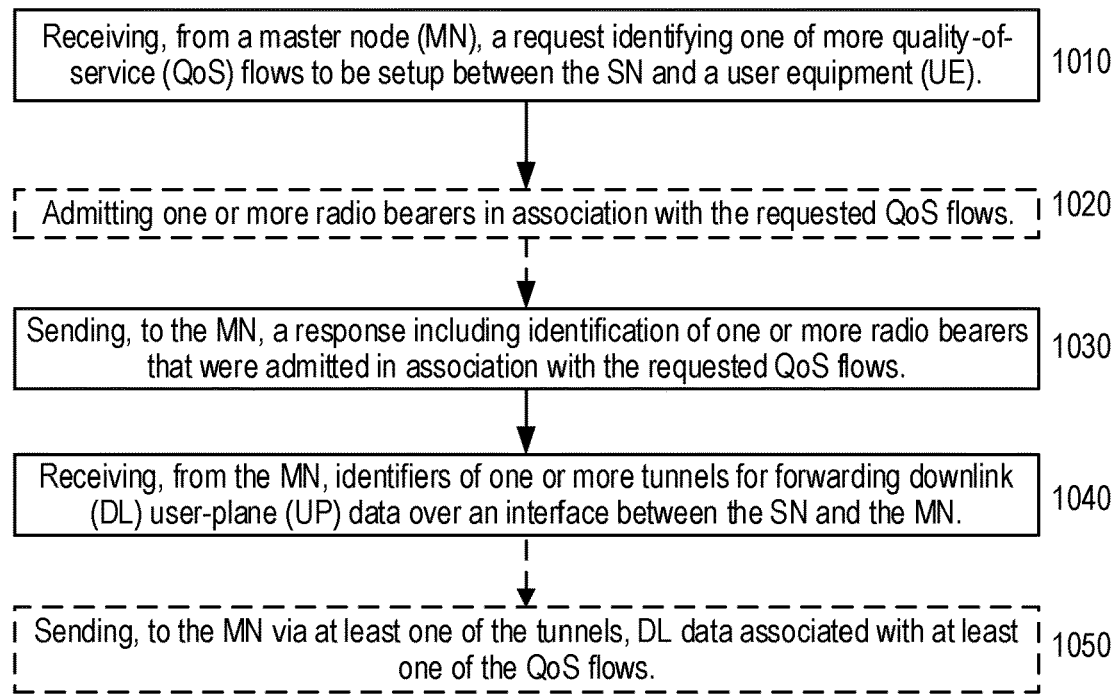
FIG. 10 is a flow diagram illustrating exemplary methods and/or procedures performed by a secondary node (SN, e.g., base station, eNB, gNB, etc. or component thereof) in a RAN, according to various exemplary embodiments of the present disclosure.

FIG. 10 is a flow diagram illustrating an exemplary method and/or procedure for establishing radio resources between a secondary node (SN) and a user equipment (UE)), according to various exemplary embodiments of the present disclosure. The exemplary method and/or procedure shown in FIG. 10 can be implemented, for example, by a secondary node (SN) (e.g., base station, eNB, gNB, etc. or component thereof) in a radio access network (RAN). Furthermore, the exemplary method and/or procedure shown in FIG. 10 can be utilized cooperatively with other exemplary method and/or procedures described herein (e.g., FIG. 9) to provide various exemplary benefits described herein. Although FIG. 10 shows blocks in a particular order, this order is merely exemplary and the operations of the exemplary method and/or procedure can be performed in a different order than shown, and can be combined and/or divided into blocks having different functionality than shown. Optional operations are indicated by dashed lines.

The exemplary method and/or procedure illustrated in FIG. 10 can include the operations of block 1010, in which the SN can receive, from the MN, a request identifying one of more quality-of-service (QoS) flows to be setup between the SN and the UE. In some embodiments, the one or more QoS flows identified in the request can be related to SN-terminated radio bearers that require resources provided by the MN.

In some embodiments, the exemplary method and/or procedure can also include the operations of block 1020, in which the SN can admit one or more radio bearers in association with the requested QoS flows. The exemplary method and/or procedure can also include the operations of block 1030, in which the SN can send, to the SN, a response including identification of one or more radio bearers that were admitted (e.g., in block 1020) in association with the requested QoS flows. For example, the admitted radio bearers can include secondary cell group (SCG) bearers, master cell group (MCG) bearers, and SCG split bearers, as illustrated in FIG. 6A.

The exemplary method and/or procedure can also include the operations of block 1040, in which the SN can receive, from the MN, identifiers of one or more tunnels for forwarding downlink (DL) user-plane (UP) data over an interface between the SN and the MN (e.g., an Xn interface). Each tunnel identifier can be associated with a respective admitted radio bearer. For example, each tunnel identifier can be associated with an SN-terminated radio bearer that requires resources provided by the MN, such as a secondary cell group (SCG) split bearer or a master cell group (MCG) bearer, as illustrated in FIG. 6A. In some embodiments, each tunnel identifier can include a tunnel endpoint identifier (TEID) and an Internet Protocol (IP) address.

In some embodiments, the exemplary method and/or procedure can also include the operations of block 1050, where the SN can send (e.g., forward), to the MN via at least one of the one or more tunnels, DL UP data associated with at least one of the QoS flows.

Figure 11:
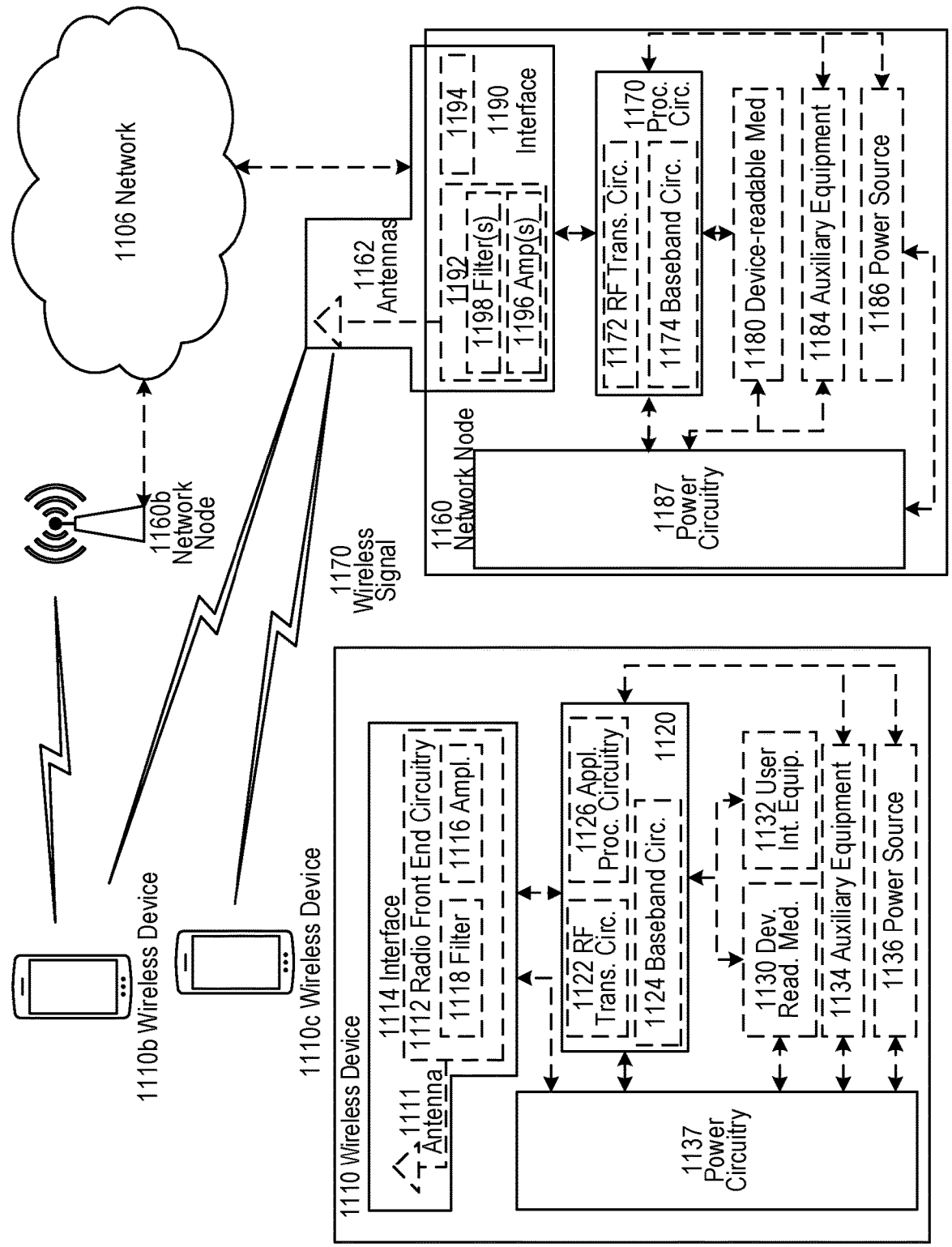
FIG. 11 illustrates an exemplary embodiment of a wireless network, according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160b, and WDs 1110, 1110b, and 1110c. In practice, a wireless network can further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, NBs, eNBs, and gNBs). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1160 are depicted as single boxes located within a larger box, or nested within multiple boxes, in practice, a network node can comprise multiple different physical components that make up a single illustrated component (e.g., device readable medium 1180 can comprise multiple separate hard drives as well as multiple RAM modules).

Similarly, network node 1160 can be composed of multiple physically separate components (e.g., a NodeB component and an RNC component, or a BTS component and a BSC component, etc.), which can each have their own respective components. In certain scenarios in which network node 1160 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1160 can be configured to support multiple radio access technologies (RATs). In such embodiments, some components can be duplicated (e.g., separate device readable medium 1180 for the different RATs) and some components can be reused (e.g., the same antenna 1162 can be shared by the RATs). Network node 1160 can also include multiple sets of the various illustrated components for different wireless technologies integrated into network node 1160, such as, for example, GSM, WCDMA, LTE, NR, WiFi, or Bluetooth wireless technologies. These wireless technologies can be integrated into the same or different chip or set of chips and other components within network node 1160.

Processing circuitry 1170 can be configured to perform any determining, calculating, or similar operations (e.g., certain obtaining operations) described herein as being provided by a network node. These operations performed by processing circuitry 1170 can include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 can execute instructions stored in device readable medium 1180 or in memory within processing circuitry 1170. Such functionality can include providing any of the various wireless features, functions, or benefits discussed herein. In some embodiments, processing circuitry 1170 can include a system on a chip (SOC).

In some embodiments, processing circuitry 1170 can include one or more of radio frequency (RF) transceiver circuitry 1172 and baseband processing circuitry 1174. In some embodiments, radio frequency (RF) transceiver circuitry 1172 and baseband processing circuitry 1174 can be on separate chips (or sets of chips), boards, or units, such as radio units and digital units. In alternative embodiments, part or all of RF transceiver circuitry 1172 and baseband processing circuitry 1174 can be on the same chip or set of chips, boards, or units In certain embodiments, some or all of the functionality described herein as being provided by a network node, base station, eNB or other such network device can be performed by processing circuitry 1170 executing instructions stored on device readable medium 1180 or memory within processing circuitry 1170. In alternative embodiments, some or all of the functionality can be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1170. Device readable medium 1180 can store any suitable instructions, data or information, including a computer program, software, an application including one or more of logic, rules, code, tables, etc. and/or other instructions capable of being executed by processing circuitry 1170 and, utilized by network node 1160. Device readable medium 1180 can be used to store any calculations made by processing circuitry 1170 and/or any data received via interface 1190. In some embodiments, processing circuitry 1170 and device readable medium 1180 can be considered to be integrated.

Interface 1190 is used in the wired or wireless communication of signaling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that can be coupled to, or in certain embodiments a part of, antenna 1162. Radio front end circuitry 1192 comprises filters 1198 and amplifiers 1196. Radio front end circuitry 1192 can be connected to antenna 1162 and processing circuitry 1170. Radio front end circuitry can be configured to condition signals communicated between antenna 1162 and processing circuitry 1170. Radio front end circuitry 1192 can receive digital data that is to be sent out to other network nodes or WDs via a wireless connection. Radio front end circuitry 1192 can convert the digital data into a radio signal having the appropriate channel and bandwidth parameters using a combination of filters 1198 and/or amplifiers 1196. The radio signal can then be transmitted via antenna 1162. Similarly, when receiving data, antenna 1162 can collect radio signals which are then converted into digital data by radio front end circuitry 1192. The digital data can be passed to processing circuitry 1170. In other embodiments, the interface can comprise different components and/or different combinations of components.

In certain alternative embodiments, network node 1160 may not include separate radio front end circuitry 1192, instead, processing circuitry 1170 can comprise radio front end circuitry and can be connected to antenna 1162 without separate radio front end circuitry 1192. Similarly, in some embodiments, all or some of RF transceiver circuitry 1172 can be considered a part of interface 1190. In still other embodiments, interface 1190 can include one or more ports or terminals 1194, radio front end circuitry 1192, and RF transceiver circuitry 1172, as part of a radio unit (not shown), and interface 1190 can communicate with baseband processing circuitry 1174, which is part of a digital unit (not shown).

Antenna 1162 can include one or more antennas, or antenna arrays, configured to send and/or receive wireless signals. Antenna 1162 can be coupled to radio front end circuitry 1190 and can be any type of antenna capable of transmitting and receiving data and/or signals wirelessly. In some embodiments, antenna 1162 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1162 can be separate from network node 1160 and can be connectable to network node 1160 through an interface or port.

Antenna 1162, interface 1190, and/or processing circuitry 1170 can be configured to perform any receiving operations and/or certain obtaining operations described herein as being performed by a network node. Any information, data and/or signals can be received from a wireless device, another network node and/or any other network equipment. Similarly, antenna 1162, interface 1190, and/or processing circuitry 1170 can be configured to perform any transmitting operations described herein as being performed by a network node. Any information, data and/or signals can be transmitted to a wireless device, another network node and/or any other network equipment.

Power circuitry 1187 can comprise, or be coupled to, power management circuitry and can be configured to supply the components of network node 1160 with power for performing the functionality described herein. Power circuitry 1187 can receive power from power source 1186. Power source 1186 and/or power circuitry 1187 can be configured to provide power to the various components of network node 1160 in a form suitable for the respective components (e.g., at a voltage and current level needed for each respective component). Power source 1186 can either be included in, or external to, power circuitry 1187 and/or network node 1160. For example, network node 1160 can be connectable to an external power source (e.g., an electricity outlet) via an input circuitry or interface such as an electrical cable, whereby the external power source supplies power to power circuitry 1187. As a further example, power source 1186 can comprise a source of power in the form of a battery or battery pack which is connected to, or integrated in, power circuitry 1187. The battery can provide backup power should the external power source fail. Other types of power sources, such as photovoltaic devices, can also be used.

Alternative embodiments of network node 1160 can include additional components beyond those shown in FIG. 11 that can be responsible for providing certain aspects of the network node's functionality, including any of the functionality described herein and/or any functionality necessary to support the subject matter described herein. For example, network node 1160 can include user interface equipment to allow and/or facilitate input of information into network node 1160 and to allow and/or facilitate output of information from network node 1160. This can allow and/or facilitate a user to perform diagnostic, maintenance, repair, and other administrative functions for network node 1160.

In some embodiments, a wireless device (WD, e.g., WD 1110) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 can include multiple sets of one or more of the illustrated components for different wireless technologies supported by WD 1110, such as, for example, GSM, WCDMA, LTE, NR, WiFi, WiMAX, or Bluetooth wireless technologies, just to mention a few. These wireless technologies can be integrated into the same or different chips or set of chips as other components within WD 1110.

Antenna 1111 can include one or more antennas or antenna arrays, configured to send and/or receive wireless signals, and is connected to interface 1114. In certain alternative embodiments, antenna 1111 can be separate from WD 1110 and be connectable to WD 1110 through an interface or port. Antenna 1111, interface 1114, and/or processing circuitry 1120 can be configured to perform any receiving or transmitting operations described herein as being performed by a WD. Any information, data and/or signals can be received from a network node and/or another WD. In some embodiments, radio front end circuitry and/or antenna 1111 can be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and can be configured to condition signals communicated between antenna 1111 and processing circuitry 1120. Radio front end circuitry 1112 can be coupled to or a part of antenna 1111. In some embodiments, WD 1110 may not include separate radio front end circuitry 1112; rather, processing circuitry 1120 can comprise radio front end circuitry and can be connected to antenna 1111. Similarly, in some embodiments, some or all of RF transceiver circuitry 1122 can be considered a part of interface 1114. Radio front end circuitry 1112 can receive digital data that is to be sent out to other network nodes or WDs via a wireless connection. Radio front end circuitry 1112 can convert the digital data into a radio signal having the appropriate channel and bandwidth parameters using a combination of filters 1118 and/or amplifiers 1116. The radio signal can then be transmitted via antenna 1111. Similarly, when receiving data, antenna 1111 can collect radio signals which are then converted into digital data by radio front end circuitry 1112. The digital data can be passed to processing circuitry 1120. In other embodiments, the interface can comprise different components and/or different combinations of components.

Processing circuitry 1120 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality can include providing any of the various wireless features or benefits discussed herein. For example, processing circuitry 1120 can execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry can comprise different components and/or different combinations of components. In certain embodiments processing circuitry 1120 of WD 1110 can comprise a SOC. In some embodiments, RF transceiver circuitry 1122, baseband processing circuitry 1124, and application processing circuitry 1126 can be on separate chips or sets of chips. In alternative embodiments, part or all of baseband processing circuitry 1124 and application processing circuitry 1126 can be combined into one chip or set of chips, and RF transceiver circuitry 1122 can be on a separate chip or set of chips. In still alternative embodiments, part or all of RF transceiver circuitry 1122 and baseband processing circuitry 1124 can be on the same chip or set of chips, and application processing circuitry 1126 can be on a separate chip or set of chips. In yet other alternative embodiments, part or all of RF transceiver circuitry 1122, baseband processing circuitry 1124, and application processing circuitry 1126 can be combined in the same chip or set of chips. In some embodiments, RF transceiver circuitry 1122 can be a part of interface 1114. RF transceiver circuitry 1122 can condition RF signals for processing circuitry 1120.

In certain embodiments, some or all of the functionality described herein as being performed by a WD can be provided by processing circuitry 1120 executing instructions stored on device readable medium 1130, which in certain embodiments can be a computer-readable storage medium. In alternative embodiments, some or all of the functionality can be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 can be configured to perform any determining, calculating, or similar operations (e.g., certain obtaining operations) described herein as being performed by a WD. These operations, as performed by processing circuitry 1120, can include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 can be operable to store a computer program, software, an application including one or more of logic, rules, code, tables, etc. and/or other instructions capable of being executed by processing circuitry 1120. Device readable medium 1130 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1120. In some embodiments, processing circuitry 1120 and device readable medium 1130 can be considered to be integrated.

User interface equipment 1132 can include components that allow and/or facilitate a human user to interact with WD 1110. Such interaction can be of many forms, such as visual, audial, tactile, etc. User interface equipment 1132 can be operable to produce output to the user and to allow and/or facilitate the user to provide input to WD 1110. The type of interaction can vary depending on the type of user interface equipment 1132 installed in WD 1110. For example, if WD 1110 is a smart phone, the interaction can be via a touch screen; if WD 1110 is a smart meter, the interaction can be through a screen that provides usage (e.g., the number of gallons used) or a speaker that provides an audible alert (e.g., if smoke is detected). User interface equipment 1132 can include input interfaces, devices and circuits, and output interfaces, devices and circuits. User interface equipment 1132 can be configured to allow and/or facilitate input of information into WD 1110, and is connected to processing circuitry 1120 to allow and/or facilitate processing circuitry 1120 to process the input information. User interface equipment 1132 can include, for example, a microphone, a proximity or other sensor, keys/buttons, a touch display, one or more cameras, a USB port, or other input circuitry. User interface equipment 1132 is also configured to allow and/or facilitate output of information from WD 1110, and to allow and/or facilitate processing circuitry 1120 to output information from WD 1110. User interface equipment 1132 can include, for example, a speaker, a display, vibrating circuitry, a USB port, a headphone interface, or other output circuitry. Using one or more input and output interfaces, devices, and circuits, of user interface equipment 1132, WD 1110 can communicate with end users and/or the wireless network, and allow and/or facilitate them to benefit from the functionality described herein.

Auxiliary equipment 1134 is operable to provide more specific functionality which may not be generally performed by WDs. This can comprise specialized sensors for doing measurements for various purposes, interfaces for additional types of communication such as wired communications etc. The inclusion and type of components of auxiliary equipment 1134 can vary depending on the embodiment and/or scenario.

Power source 1136 can, in some embodiments, be in the form of a battery or battery pack. Other types of power sources, such as an external power source (e.g., an electricity outlet), photovoltaic devices or power cells, can also be used. WD 1110 can further comprise power circuitry 1137 for delivering power from power source 1136 to the various parts of WD 1110 which need power from power source 1136 to carry out any functionality described or indicated herein. Power circuitry 1137 can in certain embodiments comprise power management circuitry. Power circuitry 1137 can additionally or alternatively be operable to receive power from an external power source; in which case WD 1110 can be connectable to the external power source (such as an electricity outlet) via input circuitry or an interface such as an electrical power cable. Power circuitry 1137 can also in certain embodiments be operable to deliver power from an external power source to power source 1136. This can be, for example, for the charging of power source 1136. Power circuitry 1137 can perform any converting or other modification to the power from power source 1136 to make it suitable for supply to the respective components of WD 1110.

Figure 12:
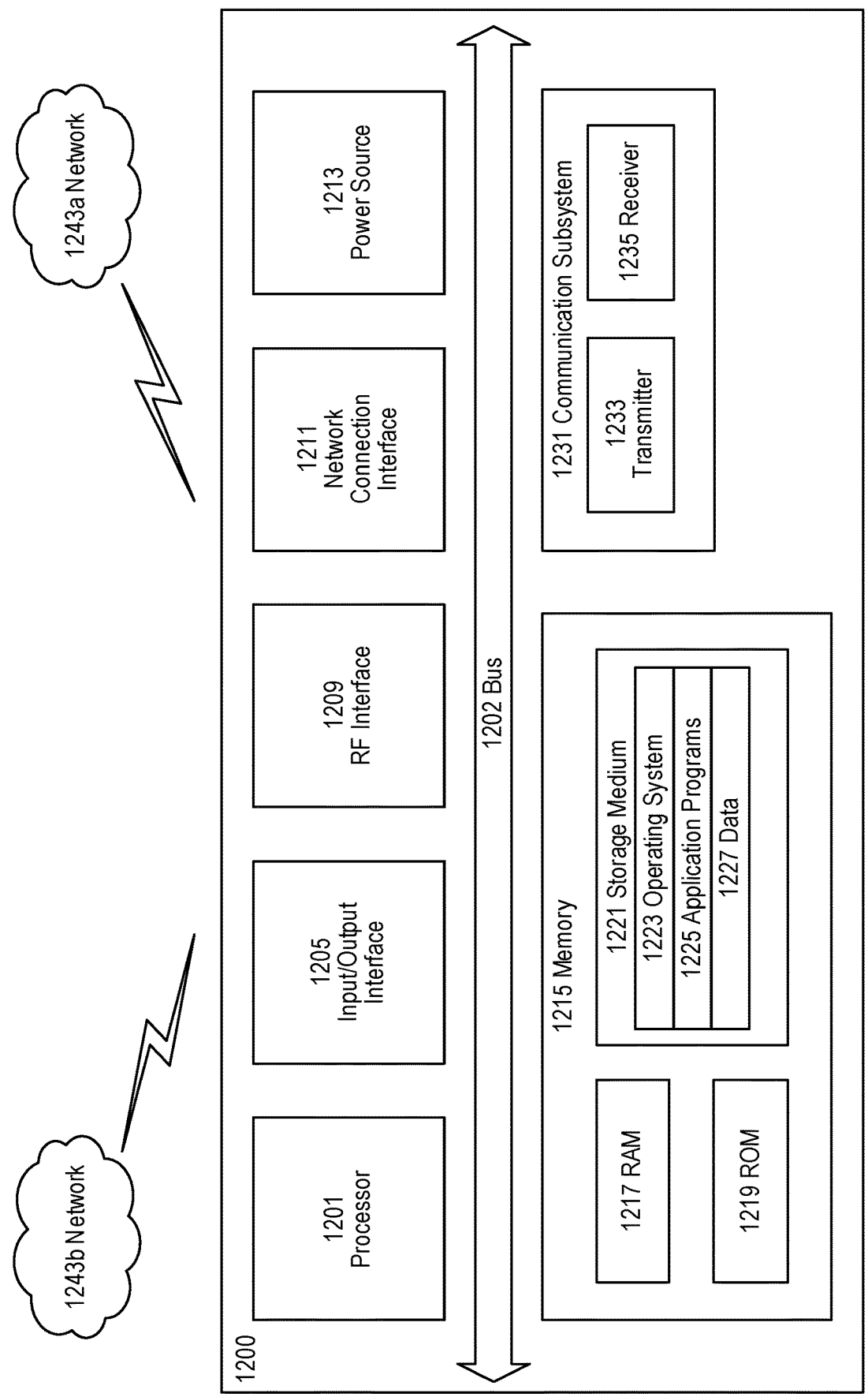
FIG. 12 illustrates an exemplary embodiment of a UE, according to various exemplary embodiments of the present disclosure.

FIG. 12 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1200 can be any UE identified by the $3^{rd}$ Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 can include other similar types of information. Certain UEs can utilize all of the components shown in FIG. 12, or only a subset of the components. The level of integration between the components can vary from one UE to another UE. Further, certain UEs can contain multiple instances of a component, such as multiple processors, memories, transceivers, transmitters, receivers, etc.

In FIG. 12, processing circuitry 1201 can be configured to process computer instructions and data. Processing circuitry 1201 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 can include two central processing units (CPUs). Data can be information in a form suitable for use by a computer.

In the depicted embodiment, input/output interface 1205 can be configured to provide a communication interface to an input device, output device, or input and output device. UE 1200 can be configured to use an output device via input/output interface 1205. An output device can use the same type of interface port as an input device. For example, a USB port can be used to provide input to and output from UE 1200. The output device can be a speaker, a sound card, a video card, a display, a monitor, a printer, an actuator, an emitter, a smartcard, another output device, or any combination thereof. UE 1200 can be configured to use an input device via input/output interface 1205 to allow and/or facilitate a user to capture information into UE 1200. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 12, RF interface 1209 can be configured to provide a communication interface to RF components such as a transmitter, a receiver, and an antenna. Network connection interface 1211 can be configured to provide a communication interface to network 1243a. Network 1243a can encompass wired and/or wireless networks such as a local-area network (LAN), a wide-area network (WAN), a computer network, a wireless network, a telecommunications network, another like network or any combination thereof. For example, network 1243a can comprise a Wi-Fi network. Network connection interface 1211 can be configured to include a receiver and a transmitter interface used to communicate with one or more other devices over a communication network according to one or more communication protocols, such as Ethernet, TCP/IP, SONET, ATM, or the like. Network connection interface 1211 can implement receiver and transmitter functionality appropriate to the communication network links (e.g., optical, electrical, and the like). The transmitter and receiver functions can share circuit components, software or firmware, or alternatively can be implemented separately.

RAM 1217 can be configured to interface via bus 1202 to processing circuitry 1201 to provide storage or caching of data or computer instructions during the execution of software programs such as the operating system, application programs, and device drivers. ROM 1219 can be configured to provide computer instructions or data to processing circuitry 1201. For example, ROM 1219 can be configured to store invariant low-level system code or data for basic system functions such as basic input and output (I/O), startup, or reception of keystrokes from a keyboard that are stored in a non-volatile memory. Storage medium 1221 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 can be configured to include operating system 1223, application program 1225 such as a web browser application, a widget or gadget engine or another application, and data file 1227. Storage medium 1221 can store, for use by UE 1200, any of a variety of various operating systems or combinations of operating systems.

Storage medium 1221 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 can allow and/or facilitate UE 1200 to access computer-executable instructions, application programs or the like, stored on transitory or non-transitory memory media, to off-load data, or to upload data. An article of manufacture, such as one utilizing a communication system can be tangibly embodied in storage medium 1221, which can comprise a device readable medium.

In FIG. 12, processing circuitry 1201 can be configured to communicate with network 1243b using communication subsystem 1231. Network 1243a and network 1243b can be the same network or networks or different network or networks. Communication subsystem 1231 can be configured to include one or more transceivers used to communicate with network 1243b. For example, communication subsystem 1231 can be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver can include transmitter 1233 and/or receiver 1235 to implement transmitter or receiver functionality, respectively, appropriate to the RAN links (e.g., frequency allocations and the like). Further, transmitter 1233 and receiver 1235 of each transceiver can share circuit components, software or firmware, or alternatively can be implemented separately.

In the illustrated embodiment, the communication functions of communication subsystem 1231 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 can include cellular communication, Wi-Fi communication, Bluetooth communication, and GPS communication. Network 1243b can encompass wired and/or wireless networks such as a local-area network (LAN), a wide-area network (WAN), a computer network, a wireless network, a telecommunications network, another like network or any combination thereof. For example, network 1243b can be a cellular network, a Wi-Fi network, and/or a near-field network. Power source 1213 can be configured to provide alternating current (AC) or direct current (DC) power to components of UE 1200.

The features, benefits and/or functions described herein can be implemented in one of the components of UE 1200 or partitioned across multiple components of UE 1200. Further, the features, benefits, and/or functions described herein can be implemented in any combination of hardware, software or firmware. In one example, communication subsystem 1231 can be configured to include any of the components described herein. Further, processing circuitry 1201 can be configured to communicate with any of such components over bus 1202. In another example, any of such components can be represented by program instructions stored in memory that when executed by processing circuitry 1201 perform the corresponding functions described herein. In another example, the functionality of any of such components can be partitioned between processing circuitry 1201 and communication subsystem 1231. In another example, the non-computationally intensive functions of any of such components can be implemented in software or firmware and the computationally intensive functions can be implemented in hardware.

Figure 13:
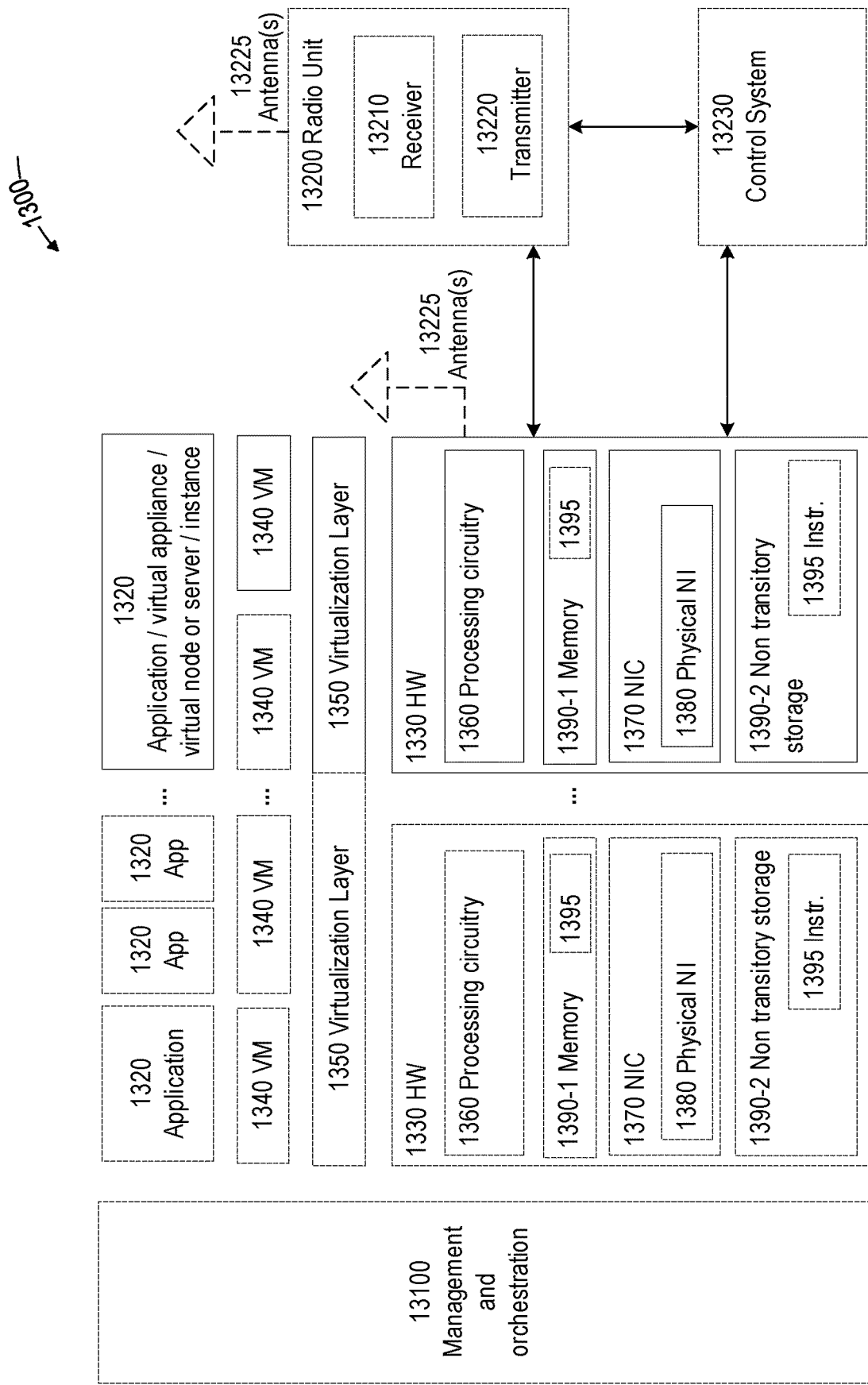
FIG. 13 is a block diagram illustrating an exemplary virtualization environment usable for implementation of various embodiments of network nodes described herein.

FIG. 13 is a schematic block diagram illustrating a virtualization environment 1300 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station, a virtualized radio access node, virtualized core network node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node can be entirely virtualized.

The functions can be implemented by one or more applications 1320 (which can alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which can be commercial off-the-shelf (COTS) processors, dedicated Application Specific Integrated Circuits (ASICs), or any other type of processing circuitry including digital or analog hardware components or special purpose processors. Each hardware device can comprise memory 1390-1 which can be non-persistent memory for temporarily storing instructions 1395 or software executed by processing circuitry 1360. Each hardware device can comprise one or more network interface controllers (NICs) 1370, also known as network interface cards, which include physical network interface 1380. Each hardware device can also include non-transitory, persistent, machine-readable storage media 1390-2 having stored therein software 1395 and/or instructions executable by processing circuitry 1360. Software 1395 can include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and can be run by a corresponding virtualization layer 1350 or hypervisor. Different embodiments of the instance of virtual appliance 1320 can be implemented on one or more of virtual machines 1340, and the implementations can be made in different ways.

During operation, processing circuitry 1360 executes software 1395 to instantiate the hypervisor or virtualization layer 1350, which can sometimes be referred to as a virtual machine monitor (VMM). Virtualization layer 1350 can present a virtual operating platform that appears like networking hardware to virtual machine 1340.

As shown in FIG. 13, hardware 1330 can be a standalone network node with generic or specific components. Hardware 1330 can comprise antenna 13225 and can implement some functions via virtualization. Alternatively, hardware 1330 can be part of a larger cluster of hardware (e.g., such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 1340 can be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

In the context of NFV, Virtual Network Function (VNF) is responsible for handling specific network functions that run in one or more virtual machines 1340 on top of hardware networking infrastructure 1330, and can correspond to application 1320 in FIG. 13.

In some embodiments, one or more radio units 13200 that each include one or more transmitters 13220 and one or more receivers 13210 can be coupled to one or more antennas 13225. Radio units 13200 can communicate directly with hardware nodes 1330 via one or more appropriate network interfaces and can be used in combination with the virtual components to provide a virtual node with radio capabilities, such as a radio access node or a base station.

In some embodiments, some signaling can be affected with the use of control system 13230 which can alternatively be used for communication between the hardware nodes 1330 and radio units 13200.

Figure 14:
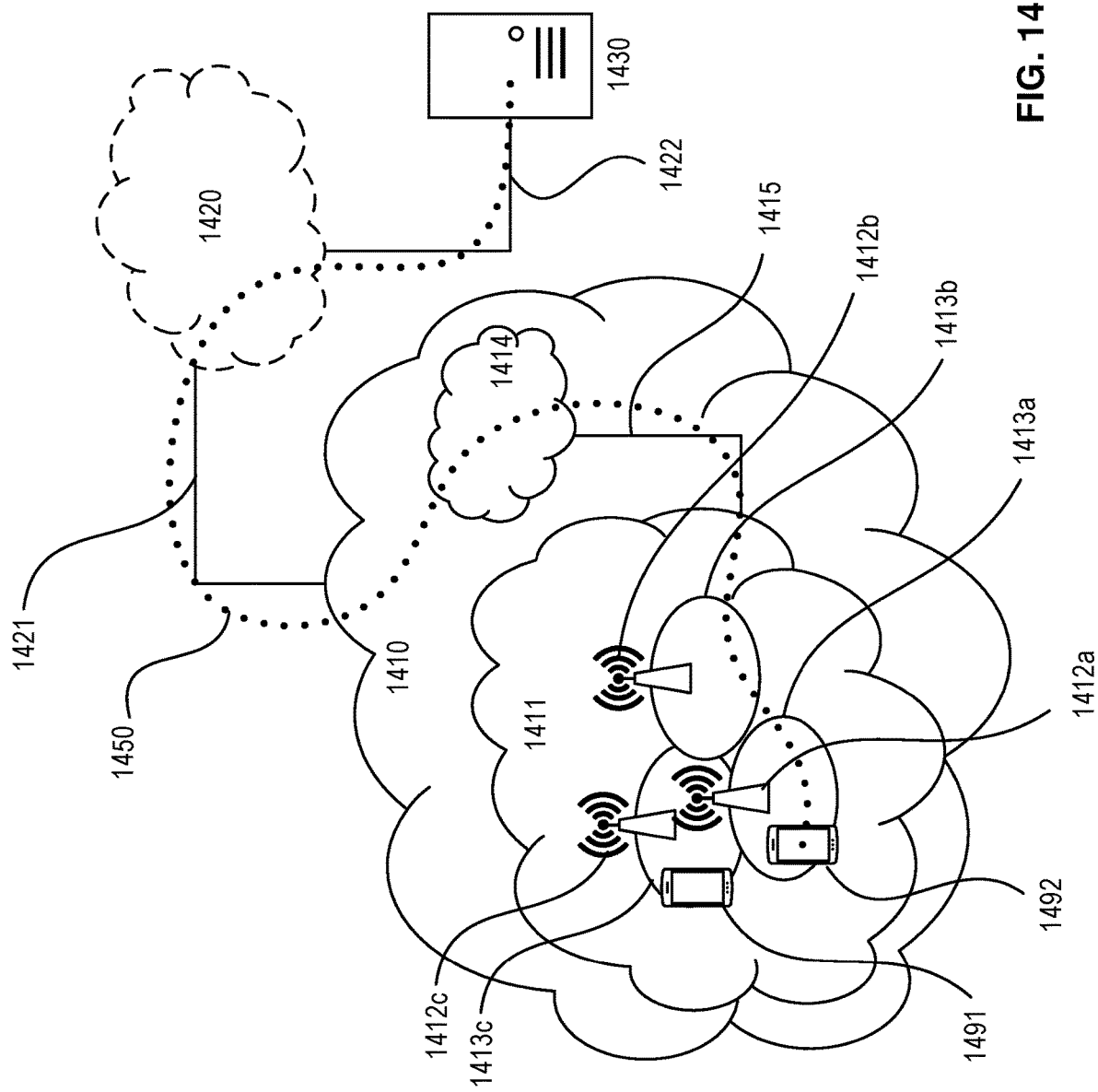
FIGS. 14-15 are block diagrams of various exemplary communication systems and/or networks, according to various exemplary embodiments of the present disclosure.

With reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c can be configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the Telecommunication network 1410 is itself connected to host computer 1430, which can be embodied in the hardware and/or software of a standalone server, a cloud-implemented server, a distributed server or as processing resources in a server farm. Host computer 1430 can be under the ownership or control of a service provider, or can be operated by the service provider or on behalf of the service provider. Connections 1421 and 1422 between telecommunication network 1410 and host computer 1430 can extend directly from core network 1414 to host computer 1430 or can go via an optional intermediate network 1420. Intermediate network 1420 can be one of, or a combination of more than one of, a public, private or hosted network; intermediate network 1420, if any, can be a backbone network or the Internet; in particular, intermediate network 1420 can comprise two or more sub-networks (not shown).

The communication system of FIG. 14 as a whole enables connectivity between the connected UEs 1491, 1492 and host computer 1430. The connectivity can be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 can be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Example implementations, in accordance with an embodiment, of the UE, base station and host computer discussed in the preceding paragraphs will now be described with reference to FIG. 15. In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which can have storage and/or processing capabilities. In particular, processing circuitry 1518 can comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 can be operable to provide a service to a remote user, such as UE 1530 connecting via OTT connection 1550 terminating at UE 1530 and host computer 1510. In providing the service to the remote user, host application 1512 can provide user data which is transmitted using OTT connection 1550.

Communication system 1500 can also include base station 1520 provided in a telecommunication system and comprising hardware 1525 enabling it to communicate with host computer 1510 and with UE 1530. Hardware 1525 can include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 can be configured to facilitate connection 1560 to host computer 1510. Connection 1560 can be direct or it can pass through a core network (not shown in FIG. 15) of the telecommunication system and/or through one or more intermediate networks outside the telecommunication system. In the embodiment shown, hardware 1525 of base station 1520 can also include processing circuitry 1528, which can comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 can also include UE 1530 already referred to. The UE's hardware 1535 can include radio interface 1537 configured to set up and maintain wireless connection 1570 with a base station serving a coverage area in which UE 1530 is currently located. Hardware 1535 of UE 1530 can also include processing circuitry 1538, which can comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 can be operable to provide a service to a human or non-human user via UE 1530, with the support of host computer 1510. In host computer 1510, an executing host application 1512 can communicate with the executing client application 1532 via OTT connection 1550 terminating at UE 1530 and host computer 1510. In providing the service to the user, client application 1532 can receive request data from host application 1512 and provide user data in response to the request data. OTT connection 1550 can transfer both the request data and the user data. Client application 1532 can interact with the user to generate the user data that it provides.

Figure 15:
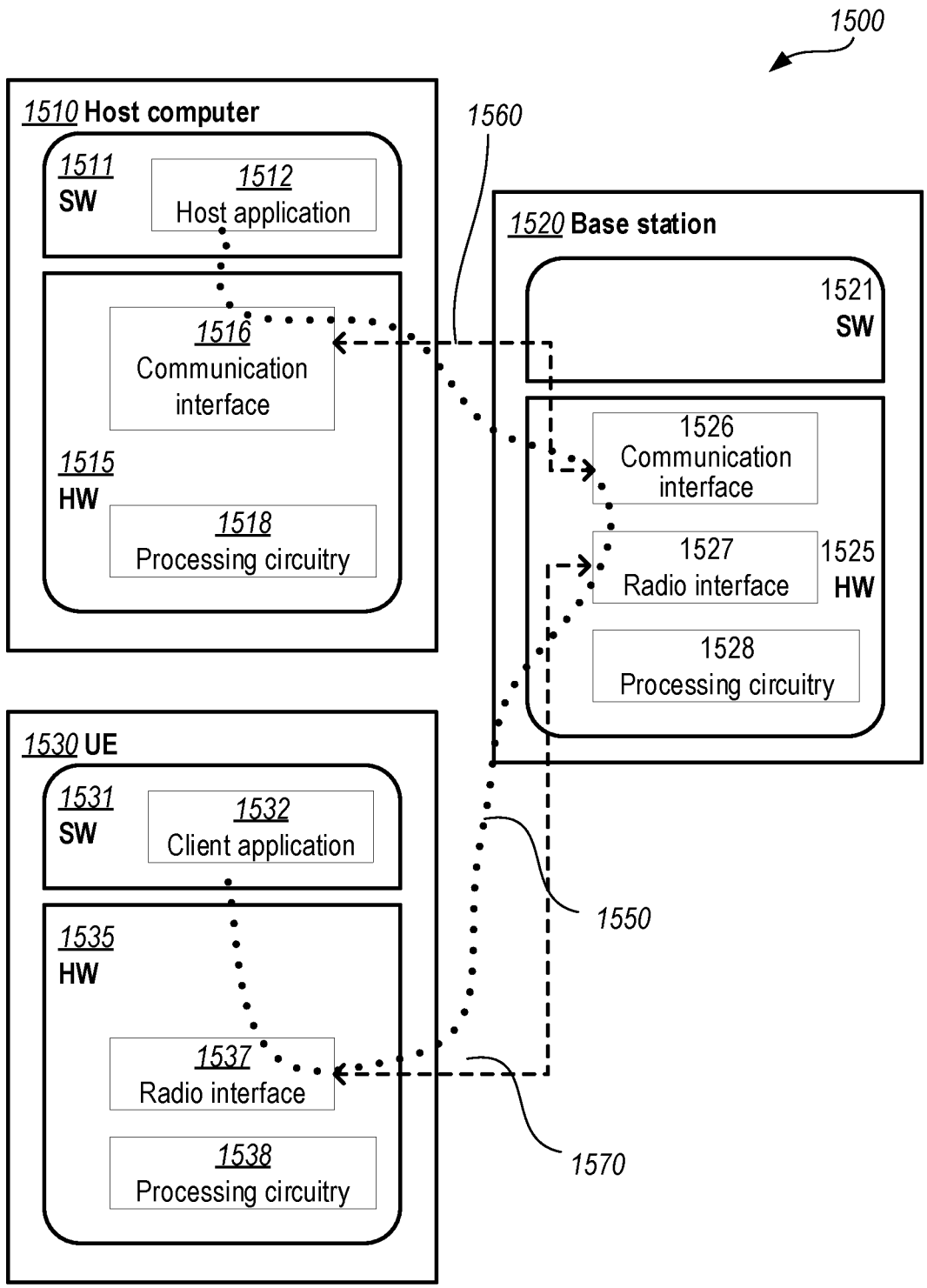

It is noted that host computer 1510, base station 1520 and UE 1530 illustrated in FIG. 15 can be similar or identical to host computer 1430, one of base stations 1412a, 1412b, 1412c and one of UEs 1491, 1492 of FIG. 14, respectively. This is to say, the inner workings of these entities can be as shown in FIG. 15 and independently, the surrounding network topology can be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure can determine the routing, which it can be configured to hide from UE 1530 or from the service provider operating host computer 1510, or both. While OTT connection 1550 is active, the network infrastructure can further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1550 between host computer 1510 and UE 1530, in response to variations in the measurement results. The measurement procedure and/or the network functionality for reconfiguring OTT connection 1550 can be implemented in software 1511 and hardware 1515 of host computer 1510 or in software 1531 and hardware 1535 of UE 1530, or both. In embodiments, sensors (not shown) can be deployed in or in association with communication devices through which OTT connection 1550 passes; the sensors can participate in the measurement procedure by supplying values of the monitored quantities exemplified above, or supplying values of other physical quantities from which software 1511, 1531 can compute or estimate the monitored quantities. The reconfiguring of OTT connection 1550 can include message format, retransmission settings, preferred routing etc.; the reconfiguring need not affect base station 1520, and it can be unknown or imperceptible to base station 1520. Such procedures and functionalities can be known and practiced in the art. In certain embodiments, measurements can involve proprietary UE signaling facilitating host computer 1510's measurements of throughput, propagation times, latency and the like. The measurements can be implemented in that software 1511 and 1531 causes messages to be transmitted, in particular empty or 'dummy' messages, using OTT connection 1550 while it monitors propagation times, errors etc.

FIG. 16 is a flowchart illustrating an exemplary method and/or procedure implemented in a communication system, in accordance with one embodiment. The communication system includes a host computer, a base station and a UE which, in some exemplary embodiments, can be those described with reference to FIGS. 14 and 15. For simplicity of the present disclosure, only drawing references to FIG. 16 will be included in this section. In step 1610, the host computer provides user data. In substep 1611 (which can be optional) of step 1610, the host computer provides the user data by executing a host application. In step 1620, the host computer initiates a transmission carrying the user data to the UE. In step 1630 (which can be optional), the base station transmits to the UE the user data which was carried in the transmission that the host computer initiated, in accordance with the teachings of the embodiments described throughout this disclosure. In step 1640 (which can also be optional), the UE executes a client application associated with the host application executed by the host computer.

FIG. 17 is a flowchart illustrating an exemplary method and/or procedure implemented in a communication system, in accordance with one embodiment. The communication system includes a host computer, a base station and a UE which can be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission can pass via the base station, in accordance with the teachings of the embodiments described throughout this disclosure. In step 1730 (which can be optional), the UE receives the user data carried in the transmission.

FIG. 18 is a flowchart illustrating an exemplary method and/or procedure implemented in a communication system, in accordance with one embodiment. The communication system includes a host computer, a base station and a UE which can be those described with reference to FIGS. 14 and 15. For simplicity of the present disclosure, only drawing references to FIG. 18 will be included in this section. In step 1810 (which can be optional), the UE receives input data provided by the host computer. Additionally or alternatively, in step 1820, the UE provides user data. In substep 1821 (which can be optional) of step 1820, the UE provides the user data by executing a client application. In substep 1811 (which can be optional) of step 1810, the UE executes a client application which provides the user data in reaction to the received input data provided by the host computer. In providing the user data, the executed client application can further consider user input received from the user. Regardless of the specific manner in which the user data was provided, the UE initiates, in substep 1830 (which can be optional), transmission of the user data to the host computer. In step 1840 of the method, the host computer receives the user data transmitted from the UE, in accordance with the teachings of the embodiments described throughout this disclosure.

FIG. 19 is a flowchart illustrating an exemplary method and/or procedure implemented in a communication system, in accordance with one embodiment. The communication system includes a host computer, a base station and a UE which can be those described with reference to FIGS. 14 and 15. For simplicity of the present disclosure, only drawing references to FIG. 19 will be included in this section. In step 1910 (which can be optional), in accordance with the teachings of the embodiments described throughout this disclosure, the base station receives user data from the UE. In step 1920 (which can be optional), the base station initiates transmission of the received user data to the host computer. In step 1930 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

1. A method, performed by a master node (MN) in a radio access network (RAN), for establishing radio resources between a secondary node (SN) and a user equipment (UE), the method comprising:
   sending, to the SN, a request identifying one of more quality-of-service (QoS) flows to be setup between the SN and the UE;
   receiving, from the SN, an identification of one or more radio bearers that were admitted by the SN in association with the requested QoS flows; and
   sending, to the SN, identifiers of one or more tunnels for forwarding user-plane (UP) data to a core network, each tunnel identifier associated with a respective admitted radio bearer.

2. The method of embodiment 1, wherein each tunnel identifier comprises a tunnel endpoint identifier (TEID) and an Internet Protocol (IP) address.

3. A method, performed by a master node (MN) in a radio access network (RAN), for establishing radio resources between a secondary node (SN) and a user equipment (UE), the method comprising:
   sending, to the SN, a request identifying:
      one or more quality-of-service (QoS) flows to be setup between the SN and the UE; and
      one or more tunnels for forwarding user-plane (UP) data to a core network;
   receiving, from the SN, a response identifying:
      one or more radio bearers that were admitted by the SN in association with the requested QoS flows; and
      for each of the admitted radio bearers, a tunnel selected by the SN, from among the one or more tunnels provided in the request, for forwarding UP data associated with the particular admitted radio bearer to the core network.

4. The method of embodiment 3, wherein the request includes one tunnel identifier associated with each of the requested QoS flows.

5. The method of any of embodiments 3-4, wherein the number of tunnel identifier included in the request is less than or equal to the maximum number of radio bearers admittable by the SN.

6. The method of any of embodiments 3-5, wherein the response implicitly identifies the tunnel selected for each admitted radio bearer based on the association between the admitted radio bearer and the requested QoS flow.

7. The method of any of embodiments 3-6, wherein each tunnel identifier comprises a tunnel endpoint identifier (TEID) and an Internet Protocol (IP) address.

8. A method, performed by a secondary node (SN) in a radio access network (RAN), for establishing radio resources between the SN and a user equipment (UE), the method comprising:
   receiving, from a master node (MN) in the RAN, a request identifying one of more quality-of-service (QoS) flows to be setup between the SN and the UE;
   admitting one or more radio bearers in association with the requested QoS flows;
   sending, to the MN, an identification of the admitted radio bearers in association with the requested QoS flows; and receiving, from the MN, identifiers of one or more tunnels for forwarding user-plane (UP) data to a core network, each tunnel identifier associated with a respective admitted radio bearer.

9. The method of embodiment 8, wherein each tunnel identifier comprises a tunnel endpoint identifier (TEID) and an Internet Protocol (IP) address.

10. A method, performed by a secondary node (SN) in a radio access network (RAN), for establishing radio resources between the SN and a user equipment (UE), the method comprising:
   receiving, from a master node (MN) in the RAN, a request identifying:
      one or more quality-of-service (QoS) flows to be setup between the SN and the UE; and
      one or more tunnels for forwarding user-plane (UP) data to a core network;
   admitting one or more radio bearers in association with the requested QoS flows;
   sending, to the MN, a response identifying:
      the admitted radio bearers in association with the requested QoS flows; and
      for each of the admitted radio bearers, a tunnel selected by the SN, from among the one or more tunnels provided in the request, for forwarding UP data associated with the particular admitted radio bearer to the core network.

11. The method of embodiment 10, wherein the request includes one tunnel identifier associated with each of the requested QoS flows.

12. The method of any of embodiments 9-11, wherein the number of tunnel identifier included in the request is less than or equal to the maximum number of radio bearers admittable by the SN.

13. The method of any of embodiments 9-12, wherein the response implicitly identifies the tunnel selected for each admitted radio bearer based on the association between the admitted radio bearer and the requested QoS flow.

14. The method of any of embodiments 9-13, wherein each tunnel identifier comprises a tunnel endpoint identifier (TEID) and an Internet Protocol (IP) address.

15. A master node (MN) configured to communicate with a secondary node (SN) in a radio access network (RAN), the MN comprising:
   a communication interface; and
   processing circuitry operably coupled to the communication interface and configured to perform any of the steps of any of embodiments 1-7; and
   power supply circuitry configured to supply power to the MN.

16. A secondary node (SN) configured to communicate with a master node (MN) in a radio access network (RAN), the SN comprising:
   a communication interface; and
   processing circuitry operably coupled to the communication interface and configured to perform any of the steps of any of embodiments 8-14; and
   power supply circuitry configured to supply power to the SN.

17. A communication system including a host computer comprising:
   processing circuitry configured to provide user data; and
   a communication interface configured to forward the user data to a cellular network for transmission to a user equipment (UE), wherein the cellular network comprises a base station having a radio interface and processing circuitry, the base station's processing circuitry configured to perform any of the operations comprising embodiments 1-14.

18. The communication system of the previous embodiment further including the base station.

19. The communication system of the previous two embodiments, further including the UE.

20. The communication system of the previous three embodiments, wherein:
   the processing circuitry of the host computer is configured to execute a host application, thereby providing the user data; and
   the UE comprises processing circuitry configured to execute a client application associated with the host application.

21. A method implemented in a communication system including a host computer, a base station, and a User Equipment (UE), the method comprising:
   at the host computer, providing user data; and
   at the host computer, initiating a transmission carrying the user data to the UE via a cellular network comprising the base station, wherein the base station performs any of the operations comprising any of embodiments 1-14.

22. The method of the previous embodiment, further comprising, at the base station, transmitting the user data.

23. The method of the previous two embodiments, wherein the user data is provided at the host computer by executing a host application, the method further comprising, at the UE, executing a client application associated with the host application.

24. A communication system including a host computer comprising a communication interface configured to receive user data originating from a transmission from a User equipment (UE) to a base station, wherein the base station comprises a radio interface and processing circuitry, the base station's processing circuitry is configured to perform operations of any of embodiments 1-14.

25. The communication system of the previous embodiment further including the base station.

26. The communication system of the previous two embodiments, further including the UE, wherein the UE is configured to communicate with the base station.

27. The communication system of the previous three embodiments, wherein:
   the processing circuitry of the host computer is configured to execute a host application; and
   the UE is configured to execute a client application associated with the host application, thereby providing the user data to be received by the host computer.

The invention claimed is:

1. A method, performed by a master node (MN) in a radio access network, for establishing radio resources between a secondary node (SN) and a user equipment (UE), the method comprising:
   sending, to the SN, an SN Addition Request message identifying one or more quality-of-service (QoS) flows to be setup between the SN and the UE, wherein the one or more QoS flows are related to SN-terminated radio bearers that require resources provided by the MN;
   receiving, from the SN, an SN Addition Request Acknowledge message including identification of one or more radio bearers that were admitted by the SN in association with the requested QoS flows; and
   sending, to the SN, address information including respective identifiers of one or more tunnels for forwarding downlink user-plane (DL UP) data over an Xn-U interface between the SN and the MN for SN-terminated bearers, wherein each tunnel identifier is associated with one of the following: a secondary cell group (SCG) split bearer; or a master cell group (MCG) bearer.

2. The method of claim 1, further comprising selecting a tunnel for one or more of the admitted radio bearers.

3. The method of claim 1, wherein each tunnel identifier includes a tunnel endpoint identifier (TEID) and an Internet Protocol (IP) address.

4. The method of claim 1, further comprising:
receiving, from the SN via at least one of the one or more tunnels, DL UP data associated with at least one of the QoS flows; and
transmitting the received DL UP data to the UE over a radio interface.

5. A non-transitory, computer-readable medium storing computer-executable instructions that, when executed by processing circuitry of a network node, of a radio access network, configured for multi-connectivity as a master node (MN) for a user equipment (UE), configure the network node to perform the method of claim 1.

6. A method, performed by a secondary node (SN) in a radio access network, for establishing radio resources between the SN and a user equipment (UE), the method comprising:
receiving, from the MN, an SN Addition Request message identifying one or more quality-of-service (QoS) flows to be setup between the SN and the UE, wherein the one or more QoS flows are related to SN-terminated radio bearers that require resources provided by the MN;
sending, to the MN, an SN Addition Request Acknowledge message including identification of one or more radio bearers that were admitted in association with the requested QoS flows; and
receiving, from the MN, address information including respective identifiers of one or more tunnels for forwarding downlink user-plane (DL UP) data over an Xn-U interface between the SN and the MN for SN-terminated bearers, wherein each tunnel identifier is associated with one of the following: a secondary cell group (SCG) split bearer; or a master cell group (MCG) bearer.

7. The method of claim 6, further comprising admitting the one or more radio bearers in association with the requested QoS flows.

8. The method of claim 6, wherein each tunnel identifier includes a tunnel endpoint identifier (TEID) and an Internet Protocol (IP) address.

9. The method of claim 6, further comprising sending, to the MN via at least one of the tunnels, DL data associated with at least one of the QoS flows.

10. A network node, of a radio access network, configured for multi-connectivity as a secondary node (SN) for a user equipment (UE), the network node comprising:
a communication interface configured to communicate with the UE and with a network node configured for multi-connectivity as a master node (MN) for the UE; and
processing circuitry operably coupled to the communication interface, whereby the processing circuitry and the communication interface are configured to perform the method of claim 6.

11. A non-transitory, computer-readable medium storing computer-executable instructions that, when executed by processing circuitry of a network node, of a radio access network, configured for multi-connectivity as a secondary node (SN) for a user equipment (UE), configure the network node to perform the method of claim 6.

12. A network node, of a radio access network, configured for multi-connectivity as a master node (MN) for a user equipment (UE), the network node comprising:
a communication interface configured to communicate with the UE and with a network node configured for multi-connectivity as a secondary node (SN) for the UE; and
processing circuitry operably coupled to the communication interface, whereby the processing circuitry and the communication interface are configured to:
send, to the SN, an SN Addition Request message identifying one or more quality-of-service (QoS) flows to be setup between the SN and the UE, wherein the one or more QoS flows are related to SN-terminated radio bearers that require resources provided by the MN;
receive, from the SN, an SN Addition Request Acknowledge message including identification of one or more radio bearers that were admitted by the SN in association with the requested QoS flows; and
send, to the SN, address information including respective identifiers of one or more tunnels for forwarding downlink user-plane (DL UP) data over an Xn-U interface between the SN and the MN for SN-terminated bearers, wherein each tunnel identifier is associated with one of the following: a secondary cell group (SCG) split bearer; or a master cell group (MCG) bearer.

* * * * *